(12) United States Patent
Ban et al.

(10) Patent No.: US 7,188,794 B2
(45) Date of Patent: Mar. 13, 2007

(54) SPINNING-REEL OSCILLATING DEVICE

(75) Inventors: Masuo Ban, Sakai (JP); Keigo Kitajima, Sakai (JP); Taisei Morise, Sakai (JP)

(73) Assignee: Shimano Inc., Osaka (JP)

( * ) Notice: Subject to any disclaimer, the term of this patent is extended or adjusted under 35 U.S.C. 154(b) by 288 days.

(21) Appl. No.: 10/923,826

(22) Filed: Aug. 24, 2004

(65) Prior Publication Data

US 2005/0045758 A1    Mar. 3, 2005

(30) Foreign Application Priority Data

Aug. 27, 2003   (JP)   ............... 2003-302347
Apr. 2, 2004    (JP)   ............... 2004-110296

(51) Int. Cl.
*A01K 89/01*    (2006.01)

(52) U.S. Cl. ..................... 242/242; 242/249

(58) Field of Classification Search ............... 242/242, 242/277, 263, 249
See application file for complete search history.

(56) References Cited

U.S. PATENT DOCUMENTS

| 3,084,885 | A  |   | 4/1963  | Hornbostel |         |
|-----------|----|---|---------|------------|---------|
| 6,170,773 | B1 |   | 1/2001  | Okada      |         |
| 6,264,125 | B1 | * | 7/2001  | Cockerham et al. | 242/242 |
| 6,484,956 | B2 | * | 11/2002 | Kawabe et al. | 242/278 |
| 6,655,620 | B2 | * | 12/2003 | Huat       | 242/242 |
| 6,742,736 | B2 | * | 6/2004  | Gruber et al. | 242/249 |
| 2002/0134873 | A1 |  | 9/2002 | Kawabe et al. | |
| 2004/0035968 | A1 |  | 2/2004 | Takikura et al. | |

FOREIGN PATENT DOCUMENTS

| DE | 20220624   | U | 12/2003 |
| EP | 1106063    | A | 6/2001  |
| EP | 1188373    | A | 3/2002  |
| FR | 1546730    | A | 11/1968 |
| JP | 52-127887  | A | 10/1977 |
| JP | 2000-175599 | A | 6/2000 |

* cited by examiner

*Primary Examiner*—Emmanuel M Marcelo
(74) *Attorney, Agent, or Firm*—Global IP Counselors, LLP

(57) ABSTRACT

An oscillating mechanism includes a first non-circular gear, a rotary cam and a slider. The first non-circular gear is a bi-lobe gear rotatable about an axis of the handle rotation. The rotary cam is rotatably mounted in the reel unit so as to be parallel with the first non-circular gear. The rotary cam includes a cam protrusion, and a multi-lobe second non-circular gear arranged so that a tooth corresponding to the minimum tip diameter of the second non-circular gear meshes with a tooth corresponding to the maximum tip diameter of the first non-circular gear. The number of teeth of the second non-circular gear is greater than that of the first non-circular gear. The slider is axially movably mounted to the spool shaft. The slider includes a cam groove engaging the cam protrusion. The present invention facilitates tight winding of fishing line in a shape closer to a cylindrical shape.

16 Claims, 17 Drawing Sheets

SPINNING-REEL OSCILLATING DEVICE

BACKGROUND OF THE INVENTION

1. Field of the Invention

The present invention relates to a spinning-reel oscillating device. More specifically, the present invention relates to a spinning-reel oscillating device for oscillating a spool that is attached to a reel unit of a spinning reel front and rear in cooperation with handle rotation via a spool shaft.

2. Background Information

A spinning reel includes an oscillating mechanism (one example of spinning-reel oscillating device) for oscillating a spool front and rear in cooperation with handle rotation. With this type of oscillating mechanism, it is known to employ a reduction gear in which a slider is shifted by a rotary shaft, or a transverse cam system in which a slider is shifted by a threaded shaft arranged parallel to a spool axis.

With this type of reduction gear oscillating mechanism, the spool is axially oscillated by converting rotational movement into rectilinear movement. Accordingly, the speed of axial movement of the spool is much slower, thus, fishing line is prone to be wound onto the spool in an hourglass shape, whose ends expand, rather than in a cylindrical shape whose outer peripheral surface is parallel to a spool body. To address this issue, in order to wind fishing line in a shape closer to a cylindrical shape, it is conventionally known to axially oscillate a spool while suppressing variation of the speed of axial movement by combining two bi-lobe elliptic gears which are noncircular gears (see, for example, Japanese unexamined patent application publication 52-127887) among reduction gear oscillating mechanisms.

The above conventional oscillating mechanism includes a bi-lobe first elliptic gear, a rotary cam, and a slider. The first elliptic gear which is a non-circular gear is provided on a handle shaft. The rotary cam includes a second elliptic gear having teeth, the number of which is equal to that of the first elliptic gear. The second elliptic gear is arranged to mesh with the first elliptic gear such that their major axis lines come orthogonal to each other every time the second elliptic gear rotates 90°. The slider engages the rotary cam, and is axially shifted. A spool shaft is mounted to the slider so as to be immovable in the axial direction relative to the slider.

In the case that the conventional oscillating mechanism with this configuration is used, since mesh between the elliptic gears converts rotational movement of the handle into axial movement of the slider, the speed of axial movement of the spool does not vary too much relative to the rotation of the handle. As a result, the fishing line can be wound in a shape closer to a cylindrical shape.

With the above conventional configuration, the mesh between the two elliptic gears, which are orthogonal to each other, convert rotational movement of the handle into axial movement of the slider, thus the speed of axial movement of the spool does not vary too much relative to the rotation of the handle. However, since the two elliptic gears have the same number of teeth, the rotation speed of the handle is equal to the rotary cam. For this reason, the spool is axially oscillated in a relatively high speed, therefore, the fishing line cannot be tightly wound onto the spool.

In view of the above, it will be apparent to those skilled in the art from this disclosure that there exists a need for an improved spinning reel oscillating device that overcomes the above described problems of the conventional art. This invention addresses this need in the art as well as other needs, which will become apparent to those skilled in the art from this disclosure.

SUMMARY OF THE INVENTION

It is an object of the present invention to provide a spinning-reel oscillating device to facilitate tight winding of fishing line in a shape that is closer to a cylindrical shape.

A spinning-reel oscillating device according to a first aspect of the invention is for oscillating a spool front and rear as a handle of the spinning reel rotates. The spool is attached to a spool shaft in a reel unit of the spinning reel. The oscillating device includes a bi-lobe first non-circular gear mounted to a rotational axis of the handle, a rotary cam rotatably mounted in the reel unit so as to be parallel with the first non-circular gear, and a slider mounted in the reel unit so as to be movable in an axial direction of the spool shaft, the slider being mounted to the spool shaft so as to be relatively immovable at least in the axial direction of the spool shaft, the slider including a cam groove that engages the cam protrusion. The rotary cam includes a cam protrusion protruding in a direction that is parallel to the rotational axis, and a multi-lobe second non-circular gear mounted in the reel unit such that a tooth corresponding to a minimum tip diameter of one of the first and second non-circular gears meshes with a tooth corresponding to a maximum tip diameter of the other of the first and second non-circular gears, the number of teeth of the second non-circular gear being greater than that of the first non-circular gear.

This spinning-reel oscillating device has the first non-circular gear and the second non-circular gear that has a greater number of teeth than the first non-circular gear. Thus, when the first non-circular gear is rotated by a handle, the handle rotation is geared down, and then transmitted to the rotary cam through the first and second non-circular gears. When the rotary cam is rotated, the cam protrusion thrusts the cam groove, and then the slider is axially oscillated. Thus, the spool is axially oscillated via the spool shaft. In this case, since the gearing down is achieved between the first non-circular gear and the second non-circular gear, the speed of axial movement of the slider is low. This facilitates tight winding of the fishing line. In addition, the bi-lobe first non-circular gear and the multi-lobe second non-circular gear are arranged so that the tooth corresponding to the minimum tip diameter of the second non-circular gear meshes with the tooth corresponding to the maximum tip diameter of the first non-circular gear. Therefore, the movements of the slider can be brought to almost uniform velocity rectilinear motions by modifying the angular velocity of the second non-circular gear during its rotation, even if the first non-circular gear rotates at a uniform angular velocity.

A spinning-reel oscillating device according to a second aspect of the invention is for oscillating a spool front and rear as a handle of the spinning reel rotates. The spool is attached to a spool shaft in a reel unit of the spinning reel. The oscillating device includes a first circular gear mounted to a rotational axis of the handle; an intermediate gear unit rotatably mounted in the reel unit; a rotary cam rotatably mounted in the reel unit so as to be parallel with the first non-circular gear; a slider mounted in the reel unit so as to be movable in an axial direction of the spool shaft, the slider being mounted to the spool shaft so as to be relatively immovable at least in the axial direction of the spool shaft, the slider including a cam groove that engages the cam protrusion. The intermediate gear unit includes a second circular gear mounted in the reel unit so as to be parallel with the first circular and meshing with the first circular gear, the number of teeth of the second circular gear being greater than that of the first circular gear, and a bi-lobe first non-circular gear mounted concentrically with the second circular gear, the number of teeth of the second circular gear being greater than that of the first circular gear. The rotary cam includes a cam protrusion protruding in a direction that is parallel to the rotational axis, and a multi-lobe second non-circular gear mounted in the reel unit such that a tooth corresponding to a minimum tip diameter of one of the first and second non-circular gears meshes with a tooth corresponding to a maximum tip diameter of the other of the first and second non-circular gears.

With this spinning-reel oscillating device, when the first circular gear is rotated by a handle, the handle rotation is geared down, and then transmitted to the intermediate gear unit through a combination of the first circular gear and the second circular gear, the second circular gear having a greater number of teeth. The rotation of the intermediate gear unit is transmitted from the first non-circular gear to the second non-circular gear, and then the rotary cam is rotated. When the rotary cam is rotated, the cam protrusion thrusts the cam groove, and then the slider is axially oscillated. Thus, the spool is axially oscillated via the spool shaft. In this case, since the gearing down is achieved between the first circular gear and the second circular gear, the speed of the axial movement of the slider is low. This facilitates tight winding of the fishing line. In addition, the bi-lobe non-circular gear and the multi-lobe second non-circular gear are arranged so that the tooth corresponding to the minimum tip diameter of one of the first and second non-circular gears meshes with the tooth corresponding to the maximum tip diameter of the other of the first and second non-circular gears. Therefore, the movement of the slider can be brought close to a uniform velocity rectilinear motion by modifying the angular velocity of the second non-circular gear during its rotation, even when the first non-circular gear rotates at a uniform angular velocity.

Preferably, in the spinning-reel oscillating device according the second aspect of the invention, the number of the second non-circular gear is greater than the first non-circular gear. In this case, the gearing down is achieved also by mesh between the fist and second non-circular gears. Thus, this can further facilitate tight winding of the fishing line.

Preferably, in any of the above described the spinning-reel oscillating device, the second non-circular gear is a quad-lobe or penta-lobe non-circular gear. In this case, since the number of lobes of the two non-circular gears is different from each other, the gearing down is achieved by varying the number of teeth of the second non-circular gear.

Preferably, in any of the above described the spinning-reel oscillating device, at least one of the first non-circular gear and the second non-circular gear is provided with a first mark that indicates the tooth corresponding to a maximum or minimum tip diameter. In this case, the rotational phases of the two non-circular gears can be easily adjusted to a particular phase (a phase in which the tooth corresponding to the maximum tip diameter meshes with the tooth corresponding to the minimum tip diameter) by using the first mark.

Preferably, in any of the above described the spinning-reel oscillating device, the first mark is provided at a tooth corresponding to the maximum tip diameter of one of the first and second non-circular gears, and at a tooth corresponding to the minimum tip diameter of the other of the first and second non-circular gears. In this case, adjusting the two first marks can position the two non-circular gears in a particular phase.

Preferably, in any of the above described the spinning-reel oscillating device, the reel unit is provided with a second mark that is adapted to be aligned with the first mark. In this case, the two non-circular gears can be easily positioned in a particular phase with reference to the second mark on the reel unit even if portions of the first and second non-circular gears where the two non-circular gears mesh with each other cannot be viewed.

Preferably, in any of the above described the spinning-reel oscillating device, the reel unit is provided with two second marks, a master gear that is adapted to be mounted to the rotational axis of the handle so as to be concentric with the first non-circular gear is provided with a third mark, and the first, second, and the third marks are positioned such that when the first and second non-circular gears and the master gear are mounted in the reel unit with the first, second, and the third marks being aligned, a tooth corresponding to the minimum tip diameter of one of the first and second non-circular gears is meshed with a tooth corresponding to the maximum tip diameter of the other of the first and second non-circular gears. In this case, by merely aligning the first marks and the second and third marks, it is possible to adjust the two non-circular gears in a particular rotational phase.

A spinning-reel oscillating device according to a third aspect of the invention is for oscillating a spool front and rear as a handle of the spinning reel rotates. The spool is attached to a spool shaft in a reel unit of the spinning reel. The oscillating device includes a slider that is mounted to the spool shaft so as to be axially immovable relative to the spool shaft, converting means for converting rotations of the handle to oscillating movements of the slider, gear reduction means for transmitting the rotation of the handle to the converting means while reducing a rotational speed, and speed control means for controlling the speed of the oscillating movements of the slider.

Preferably, in the spinning-reel oscillating device of the third aspect, the speed control means includes a bi-lobe first non-circular gear mounted to a rotational axis of the handle, and a second multi-lobe non-circular gear rotatably mounted in the reel unit such that a tooth corresponding to a minimum tip diameter of one of the first and second non-circular gears meshes with a tooth corresponding to a maximum tip diameter of the other of the first and second non-circular gears.

Preferably, in the spinning-reel oscillating device of the third aspect, the gear reduction means includes a bi-lobe first non-circular gear mounted to a rotational axis of the handle, and a second multi-lobe non-circular gear rotatably mounted in the reel unit and meshing the first non-circular gear, the number of teeth of the second non-circular gear being greater than that of the first non-circular gear.

Alternatively, in the spinning-reel oscillating device of the third aspect, the gear reduction means includes a first circular gear mounted to a rotational axis of the handle, and a second circular gear rotatably mounted in the reel unit and meshing the first circular gear, the number of teeth of the second circular gear being greater than that of the first circular gear. Preferably, in the spinning-reel oscillating device, the speed control means includes a bi-lobe first non-circular gear mounted concentrically with the second circular gear, and a second multi-lobe non-circular gear rotatably mounted in the reel unit such that a tooth corresponding to a minimum tip diameter of one of the first and second non-circular gears meshes with a tooth corresponding to a maximum tip diameter of the other of the first and second non-circular gears.

Preferably, in the spinning-reel oscillating device of the third aspect, the converting means includes a cam groove provided in the slider and a rotary cam, the rotary cam being rotatably mounted in the reel unit and including a cam protrusion that engages the cam groove.

According to another aspect of the invention, since the gearing down is achieved between the first circular gear and the second circular gear, the speed of axial movement of the slider is low. This facilitates tight winding. Moreover, the bi-lobe non-circular gear and the multi-lobe second non-circular gear are arranged so that a tooth corresponding to the minimum tip diameter of the second non-circular gear meshes with a tooth corresponding to the maximum tip diameter of the first non-circular gear. Therefore, the movement of the slider can be brought near to a uniform velocity rectilinear motion by variation of angular velocity of the second non-circular gear during its rotation even in the case of uniform angular velocity motion of the first non-circular gear.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
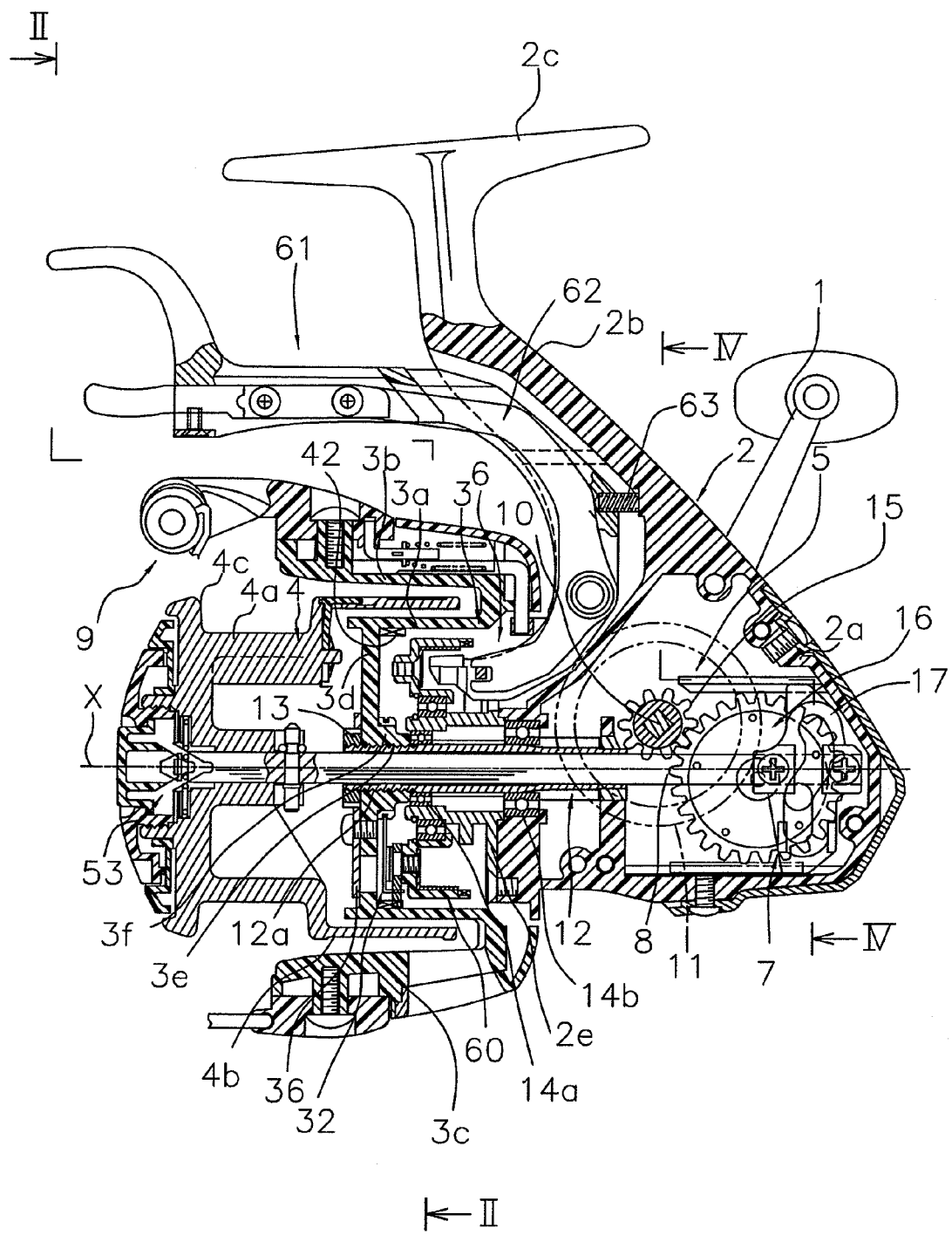
FIG. 1 is a cross-sectional side view a spinning reel in accordance with a first embodiment of the present invention.

As shown in FIG. 1, a spinning reel according to a first embodiment of the present invention is a lever brake type of reel which rotates about a first axis X and winds fishing line around the first axis X, which is parallel to the fishing rod. The spinning reel includes a reel unit 2 that includes a handle 1, a rotor 3 that is rotatably supported about the first axis X on a front portion of the reel unit 2, and a spool 4 that is disposed on the front portion of the rotor 3 and around which fishing line is wound.

The reel unit 2 is made of a synthetic resin, for example. The reel unit 2 includes an attachment portion 2c that extends from the front to the rear of the reel unit 2 and is mounted to the fishing rod, a reel body 2a that is disposed with a gap between the reel body 2a and the attachment portion 2c, and a leg portion 2b that connects the attachment portion 2c to the reel body 2a. The reel body 2a includes in its interior a mechanism accommodation space that opens to the side. The opening is covered by a lid member 2d (see FIGS. 2 and 3). A cylindrical attachment member 2e is mounted to the front of the reel body 2a. The attachment member 2e is made of a metal and includes an attachment flange.

A rotor drive mechanism 5, a lever brake mechanism 6, and an oscillating mechanism 7 (one example of the oscillating mechanism) are provided in the reel body 2a. The rotor drive mechanism 5 serves to rotate the rotor 3, the lever brake mechanism 6 serves to control the rotation of rotor 3 in the line play-out (reverse) direction, and the oscillating mechanism 7 reciprocally moves the spool 4 forward and backward via the spool shaft 8.

The rotor 3 is, for example, made of a synthetic resin or metal, and is rotatively supported by the reel unit 2. The rotor 3 includes a cylindrical portion 3a, and a first arm 3b and a second arm 3c which are arranged opposite each other on the sides of the cylindrical portion 3a. A reverse rotation check concave/convex member 42 having a shape of saw teeth is formed on the inner peripheral surface at the front wall 3d side of the cylindrical portion 3a. The reverse rotation check concave/convex member 42 is a ratchet-type one-way clutch for transmitting the rotation of the rotor 3 in the line play-out direction to the lever brake mechanism 6. A boss 3f with a through hole 3e is formed in the central portion of the front wall 3d of the cylindrical portion 3a. The spool shaft 8 and a pinion gear 12 (described later) pass through the through hole 3e. A pivotable bail arm 9 is provided between the fore end of the first arm 3b and the fore end of the second arm 3c. Fishing line is guided onto the spool 4 by the bail arm 9.

The spool 4 is a member made of a metal or a synthetic resin, and is disposed between the first arm 3b and the second arm 3c of the rotor 3. The spool 4 is detachably and non-rotatably mounted to the fore end of the spool shaft 8 extending from the front to the rear along the axis X. The spool 4 has a cylindrical bobbin 4a around which fishing line is wound, a large-diameter cylindrical skirt 4b unitarily formed with the rear end of the bobbin 4a, and a large-diameter front flange 4c unitarily formed with the front end of the bobbin 4a.

The rotor drive mechanism 5 includes a master gear 11 with a master gear shaft 11a that rotates together with a handle shaft 10 onto which the handle 1 is coupled, and a pinion gear 12 that meshes with the master gear 11. The master gear shaft 11a is rotatively supported by the reel unit 2. The pinion gear 12 is a hollow tubular member, and the spool shaft 8 passes through the center of the pinion gear 12. A front portion 12a of the pinion gear 12 passes through the through hole 3e of the rotor 3 and extends toward the spool 4. The rotor 3 is non-rotatably fastened to the pinion gear 12 at the front portion 12a by a nut 13. The pinion gear 12 is rotatively supported on the reel unit 2 by bearings 14a and 14b at the front and the center of the reel unit 2. The front bearing 14a is mounted onto the inner peripheral surface of the attachment member 2e, which is a portion of the reel unit 2. The nut 13 is prevented from rotating by means of a retainer 36. The retainer 36 is fastened with a screw thread-edly coupled to a screw hole formed on the front wall 3d.

Figure 2:
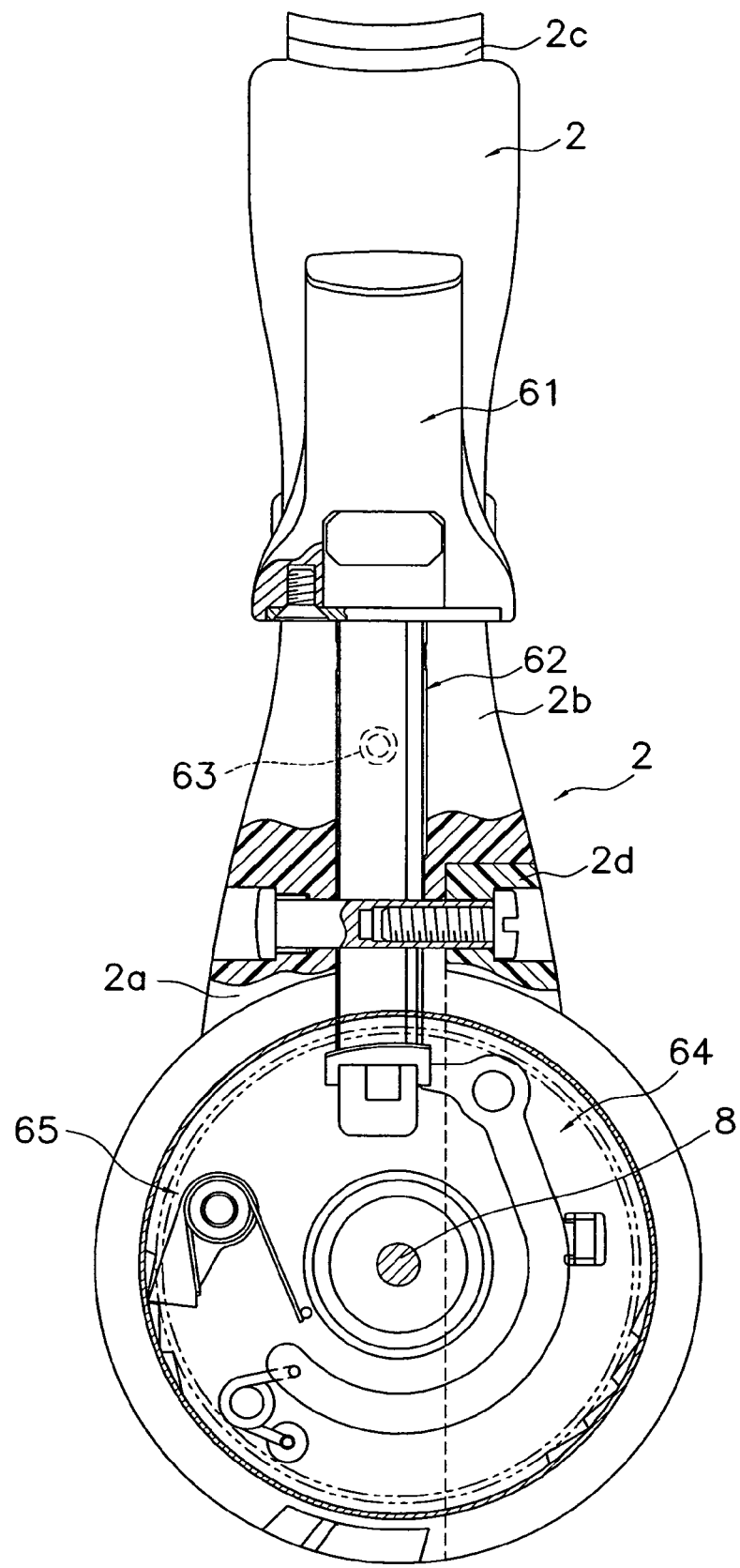
FIG. 2 is a cross-sectional view of the spinning reel in accordance with the first embodiment of the present invention, viewed along the line II—II in FIG. 1.

The lever brake mechanism 6 includes a braking portion 60, a braking lever 61, an auxiliary lever 62, a coil spring 63, a predetermined braking portion 64 (FIG. 2), and a sounding mechanism 65 (FIG. 2) as shown in FIGS. 1 and 2. The braking portion 60 serves to control the rotation of rotor 3 in the line play-out direction. The braking lever 61 adjusts the braking force of the braking portion 60. The auxiliary lever 62 operates the brake portion 16 in a predetermined brake state. The coil spring 63 urges the brake lever 61 away from the attachment portion 2c. The predetermined braking portion 64 can switch between the predetermined brake state and a brake-released state. The sounding mechanism 65 issues sound due to the reverse rotation of the rotor 3.

Configuration of the Oscillating Mechanism

Figure 3:
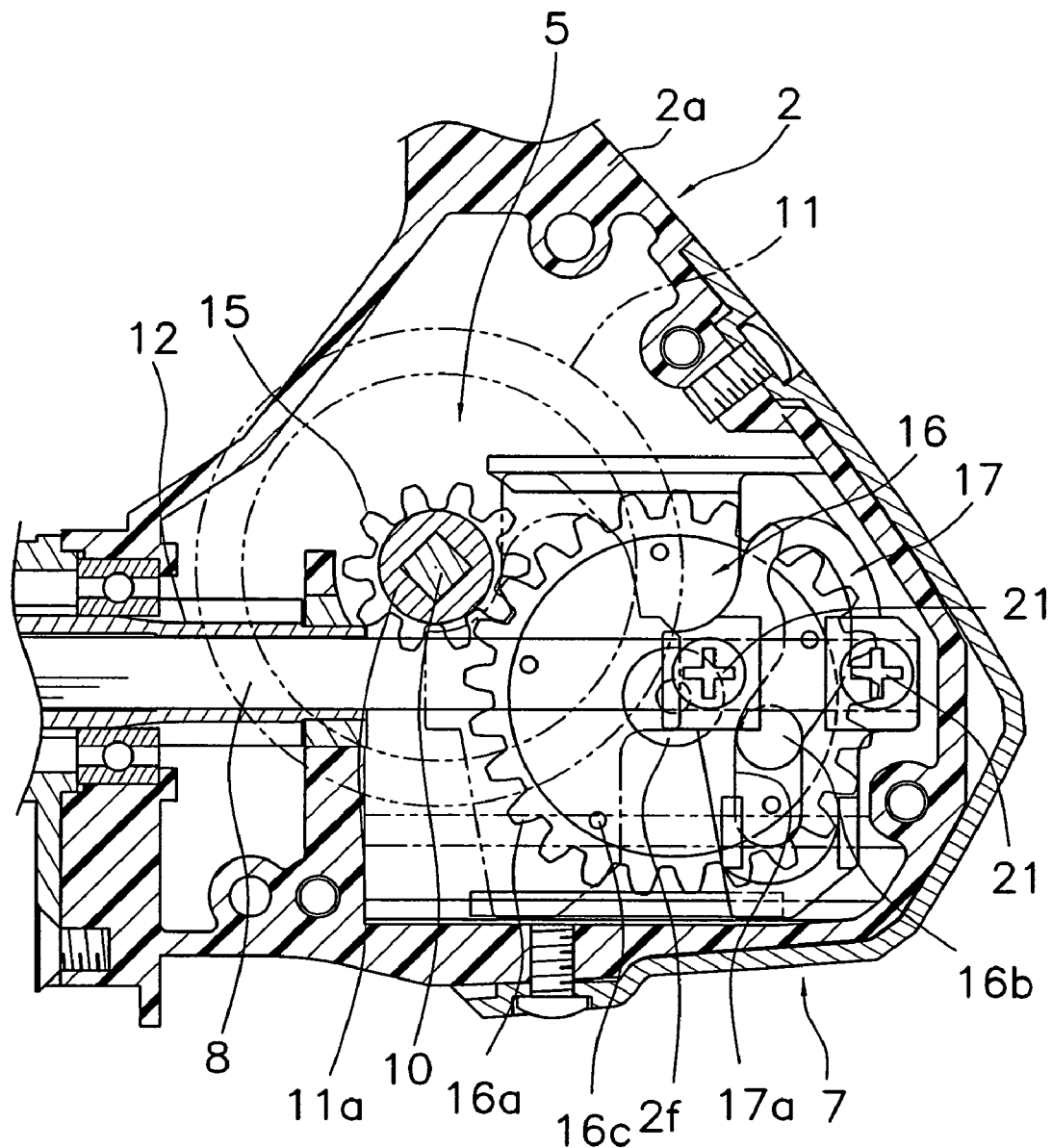
FIG. 3 is an enlarged cross-sectional view of an oscillating mechanism in accordance with the first embodiment of the present invention.
Figure 4:
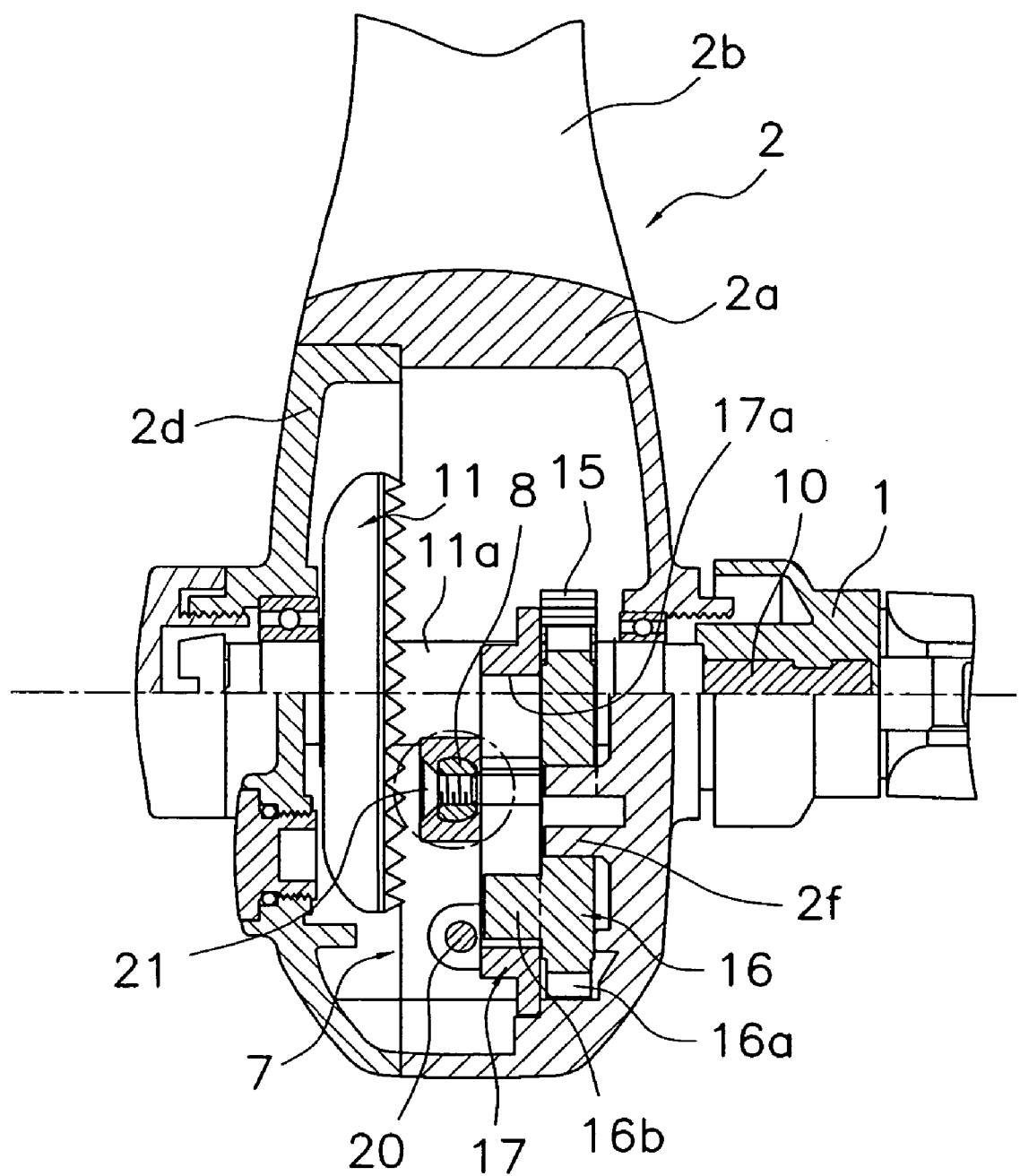
FIG. 4 is a cross-sectional view of the spinning reel in accordance with the first embodiment of the present invention viewed along the line IV—IV in FIG. 1.

The oscillating mechanism 7 is, as indicated in FIG. 3 and FIG. 4, a device that reciprocates the spool shaft 8 fixedly supported at the center of the spool 4 in the axial direction, so as to pump the spool 4 in the same direction. The oscillating mechanism 7 includes a bi-lobe first non-circular gear 15 rotating about the handle shaft 10, a rotary cam 16 with a second non-circular gear 16a meshing with the first non-circular gear 15, and a slider 17 mounted to the reel body 2a so as to be movable in the front and back direction.

The first non-circular gear 15 is a bi-lobe elliptic gear with ten teeth, for example. The first non-circular gear 15 is mounted to the handle shaft 10, and is spaced from a master gear 11. The master gear 11 is non-rotatable relative to the first non-circular gear 15. The first non-circular gear 15 and the master gear 11 can be formed integrally or separately.

The rotary cam 16 is a disc-shaped member, and is mounted to the reel body 2a so as to be rotatable about an axis that is parallel to the first non-circular gear 15. More specifically, the rotary cam 16 is rotatably mounted to an attachment shaft 2f, which protrudes from the interior wall surface in parallel with the master gear shaft 11a as shown in FIG. 4. The rotary cam 16 includes the second non-circular gear 16a formed on the outer periphery thereof, and a columnar cam protrusion 16b protruding in an axial direction that is parallel to the master gear shaft 11a. The number of teeth of the second non-circular gear 16a is greater than that of the first non-circular gear 15. The second non-circular gear 16a is a penta-lobe non-circular gear with 25 teeth, for example. The second non-circular gear 16a is arranged so that a tooth corresponding to the minimum tip diameter of the second non-circular gear 16a meshes with a tooth corresponding to the maximum tip diameter of the first non-circular gear 15. In addition, white circles 16c drawn in the rotary cam 16 as shown in FIG. 3 show the position corresponding to the maximum tip diameter.

The slider 17 includes a penetrating cam groove 17a engaging the cam protrusion 16b, and is supported to the reel body 2a so as to be oscillated in the axial direction of the spool shaft 8. The slider 17 is guided in the axial direction of the spool by a support structure including a guide shaft 20 mounted to the reel body 2a so as to be parallel to the spool shaft 8. The rear end of the spool shaft 8 is mounted to the spool 17 non-rotatably and immovably in the axial direction with countersunk screws 21.

Figure 5:
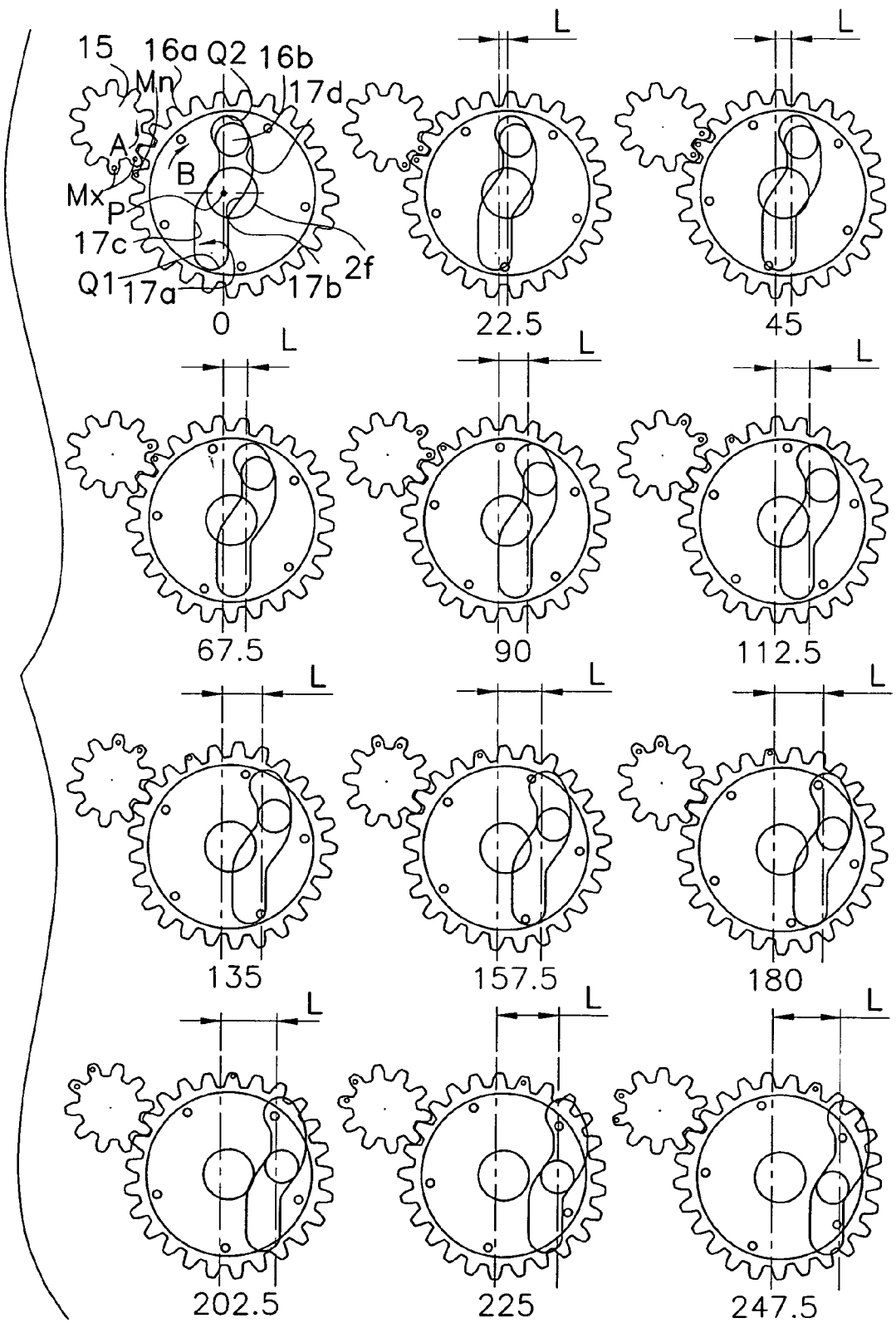
FIG. 5 is a schematic view showing position relationship among a first non-circular gear, a rotary cam and a slider in motion of the oscillating mechanism in accordance with the first embodiment of the present invention.

The cam groove 17a includes a first cam slot 17b, which extends through the center P diagonally toward opposite directions relative to the front-rear direction, and second and third cam slots 17c and 17d, which are curved from the first cam slot 17b and extend toward the bottom end Q1 and the top end Q2 respectively, as shown in FIG. 5. The bottom end of the cam groove 17a is positioned more leftward from the center P than the top end Q2 is positioned rightward as shown in FIG. 5. More specifically, the second cam slot 17c extends downwardly from the lower end of the first cam slot 17b toward the bottom end Q1 along a direction that is orthogonal to the spool shaft 8. The third cam slot 17d upwardly extends from the upper end of the first cam slot 17b along the direction that is orthogonal to the spool shaft 8, and then forwardly extends toward the top end Q2 defining a curve. In FIG. 5, the left hand slide is the forward direction of the reel, while the right hand side in the rearward direction of the reel.

Figure 7:
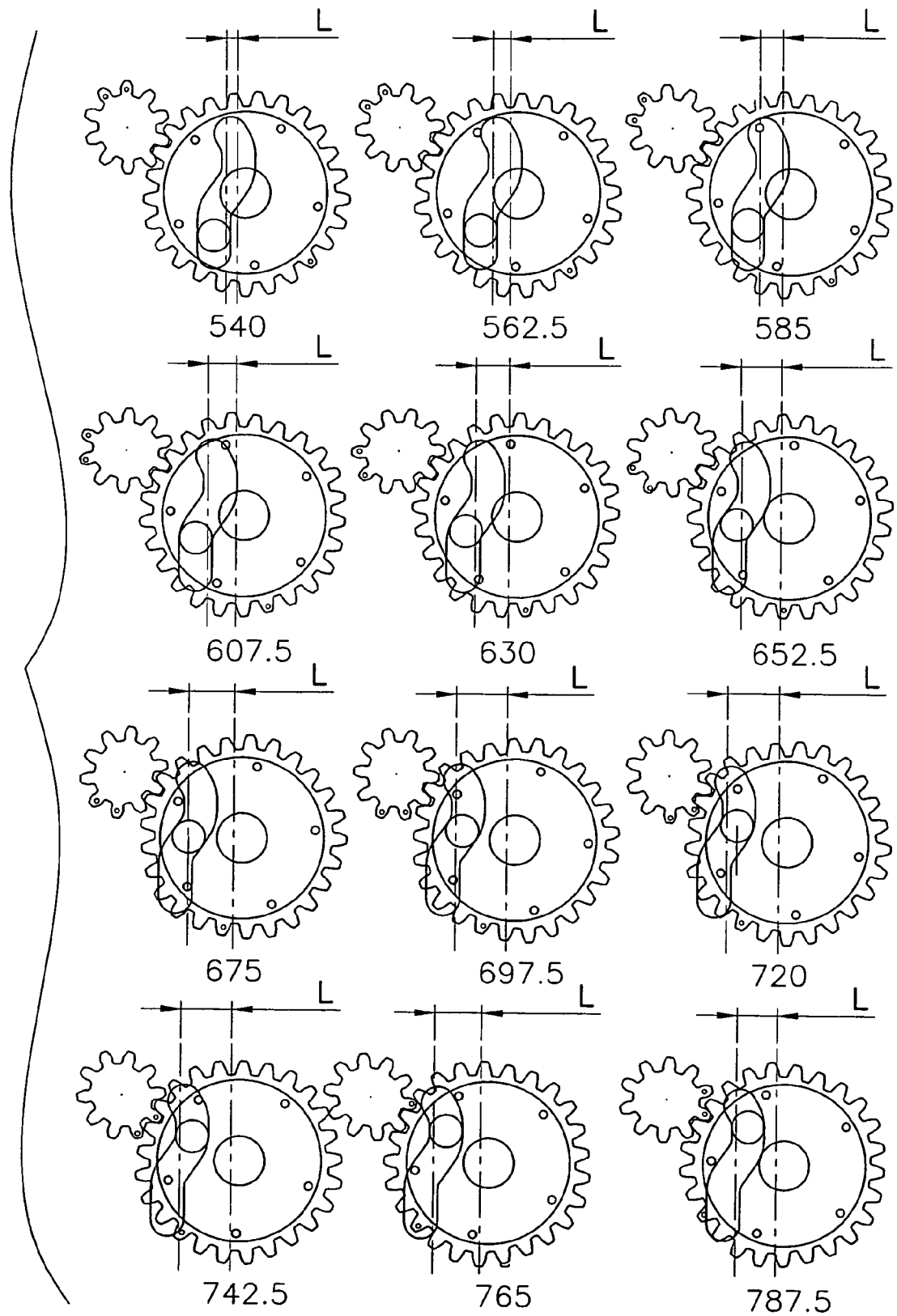
FIG. 7 is a schematic view showing position relationship among a first non-circular gear, a rotary cam and a slider in motion of the oscillating mechanism in accordance with the first embodiment of the present invention.
Figure 9:
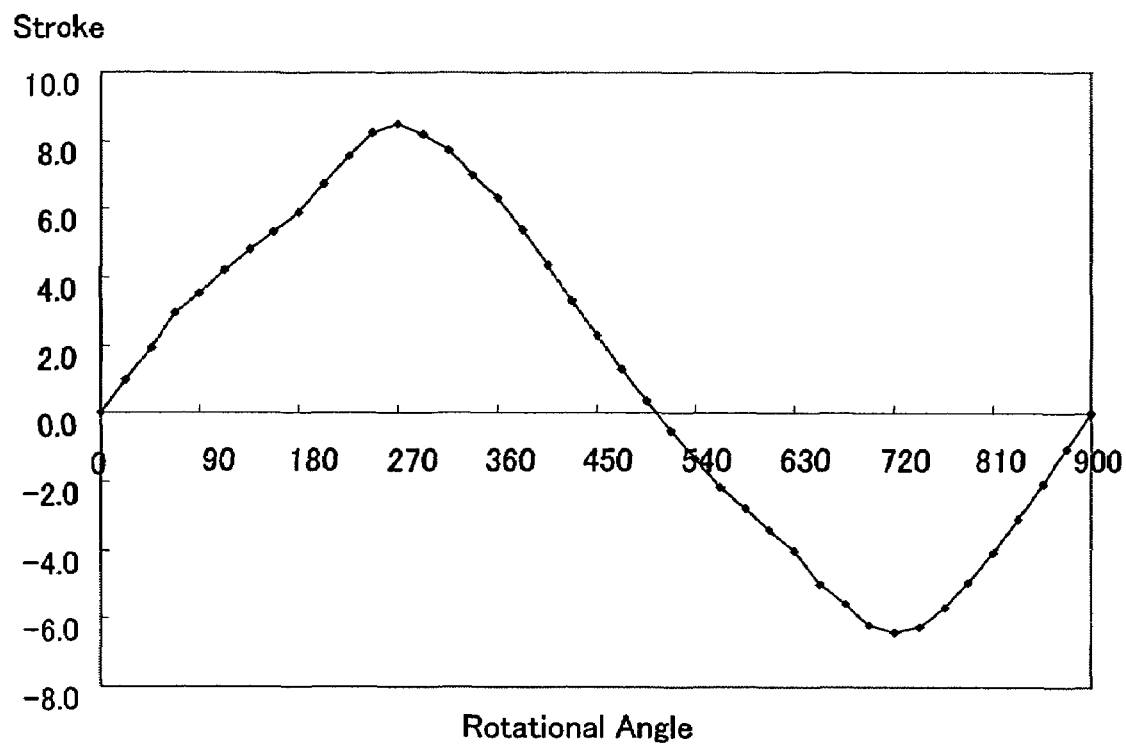
FIG. 9 is a graph showing relationship between non-circular gear rotational angle and slider stroke in accordance with the first embodiment of the present invention.

By forming the cam groove 17a in the above shape, it is possible to offset the timings at which the front and rear end positions of the stroke of the oscillation of the slider 17 are reached from those at which the cam protrusion 16b reaches its front and rear end positions. More specifically, the cam protrusion 16b reaches its front and rear end positions when the rotational angle is 675° and 225°, as seen in FIGS. 5 and 7. However, as seen in FIG. 9, the reference position P, which is the front-rear center of the cam groove 17a of the slider 17, reaches its front and rear end positions when the rotational angle is greater than 675° and 225°, respectively.

Additionally, as shown in the 0° position of FIG. 5, the cam protrusion 16b comes directly above and directly under the attachment shaft 2f at positions that are deviated in the left-right direction from the mid position of the stroke of the slider 17. In other words, the mid point of the stroke of the slider 17 is offset from the points that the cam protrusion 16b reaches when the rotational angle is 0° or 450°0. Furthermore, by offsetting the positions of the cam groove 17a in the left-right direction when the rotational angle is 0° or 450°, it is possible to make the stroke of the slider 17 greater than twice the length between the cam protrusion 16b and the center of the rotational cam 16.

In this case, since the gearing down is achieved between the first non-circular gear 15 and the second non-circular gear 16a, the speed of axial movement of the slider 17 is slow. This allows tight winding of the fishing line. In addition, the bi-lobe first non-circular gear 15 and the multi-lobe second non-circular gear 16a are arranged so that the tooth corresponding to the minimum tip diameter of the second non-circular gear 16a meshes with the tooth corresponding to the maximum tip diameter of the first non-circular gear 15. Therefore, when the first non-circular gear 15 rotates at a uniform angular velocity, the angular velocity of the second non-circular gear 16a changes during its rotation. Thus, the slider 17 can move linearly at almost a uniform velocity. Moreover, since the top and bottom portions and the front and rear end portions of the cam protrusion 16b are offset from the front and rear end position, and the mid position of the stroke of the slider 17, variation of the speed of the slider 17 at the top and bottom, and the front and rear ends of the cam protrusion 16b can be deviated from a sine curve. Thus, the slider 17 can further move linearly with a uniform velocity.

Operation and Function of the Reel

When casting, the fisherman trips the bail arm 9 into the line-play-out posture while holding the fishing line with the index finger, and then casting is carried out.

When fishing line is to be wound onto the spool 4, the bail 9 is returned to the line-retrieving posture side. In this state, rotating the handle 1 in the line-retrieving direction transmits the rotational force to the pinion gear 12 via the handle shaft 10 and the master gear 11. The rotational force transmitted to the pinion gear 12 is transmitted to the rotor 3 via the front portion 12a of the pinion gear 12.

On the other hand, the rotary cam 16 is rotated by the second non-circular gear 16a, which meshes with the first non-circular gear 15, as the master gear 11 rotates. This rotation is transmitted to the slider 17 by the cam protrusion 16b. Consequently, the slider 17 reciprocates along the axis X of the spool shaft 8.

Figure 6:
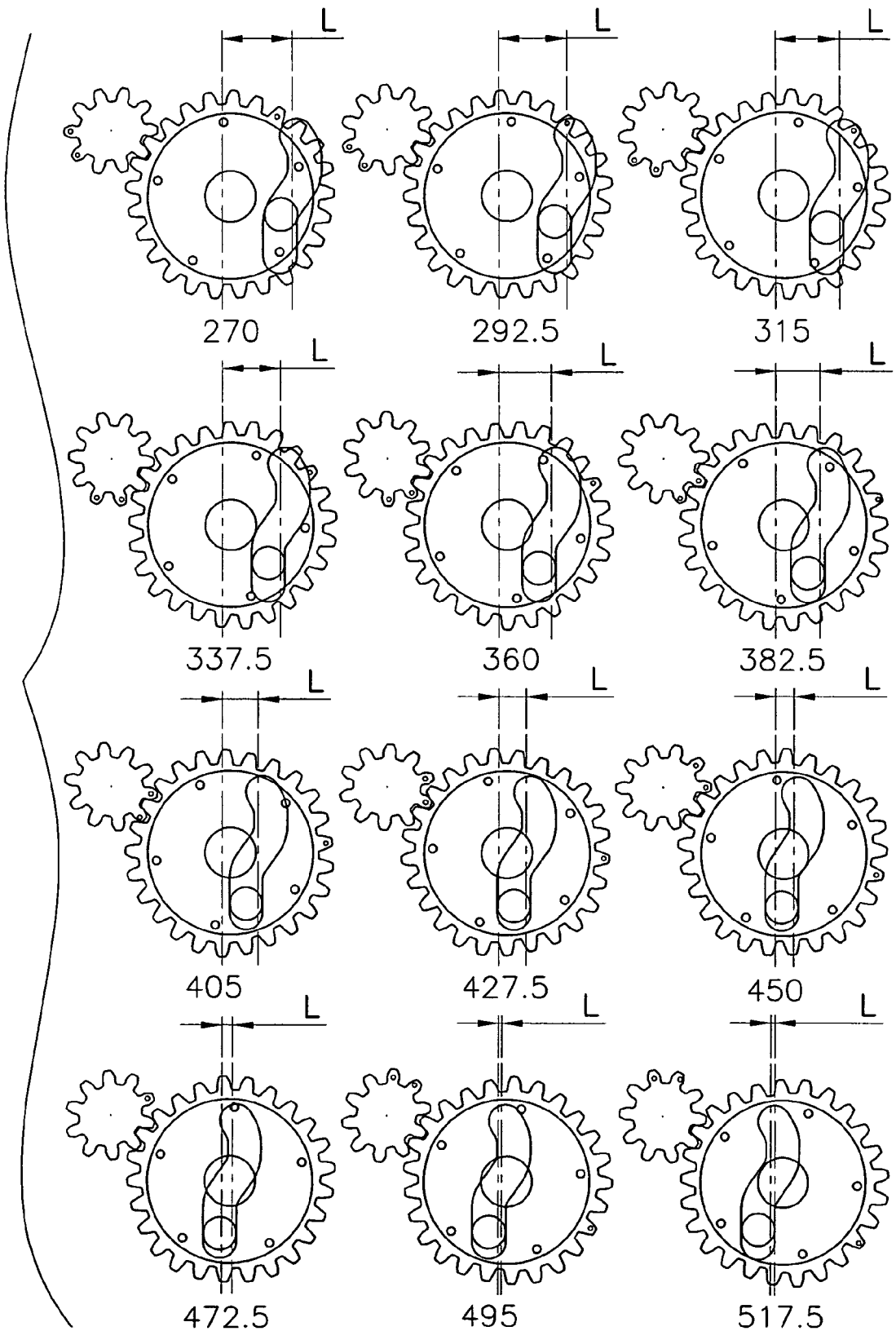
FIG. 6 is a schematic view showing position relationship among a first non-circular gear, a rotary cam and a slider in motion of the oscillating mechanism in accordance with the first embodiment of the present invention.
Figure 8:
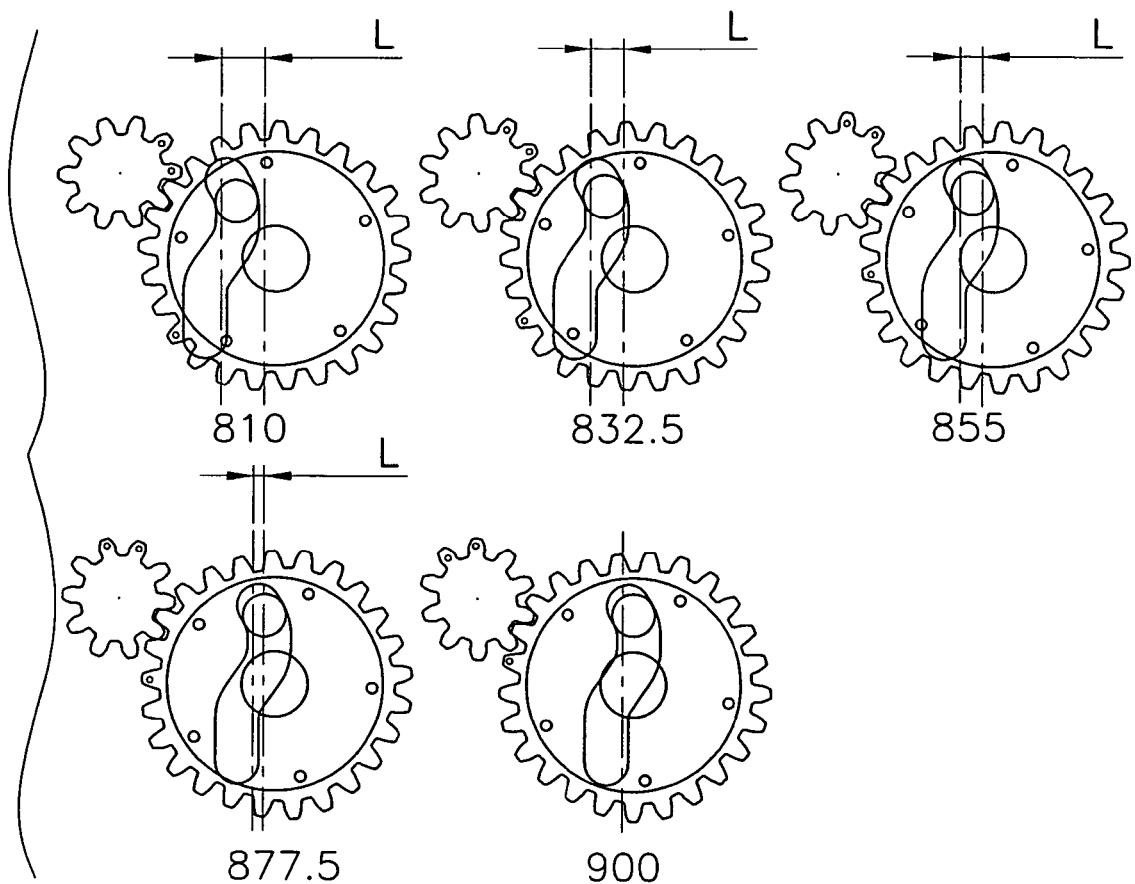
FIG. 8 is a schematic view showing position relationship among a first non-circular gear, a rotary cam and a slider in motion of the oscillating mechanism in accordance with the first embodiment of the present invention.

FIGS. 5–8 show the function of the first non-circular gear 15, the rotary cam 16 and the slider 17. These figures show the rotational phase of the second non-circular gear 16a and the axial position of the slider 17 in sequence as the fist non-circular gear 15 rotates every 22.5° until 900°. In this embodiment, the number of teeth of the first non-circular gear 15 is 10, while the number of teeth of the second non-circular gear 16a is 25. Accordingly, when first non-circular gear 15 rotates 900°, the second non-circular gear 16a rotates once (360°). In FIGS. 5–8, L represents the axial distance that the slider moved as the rotary cam 16 rotates one turn. It should be noted that reference numerals in FIGS. 6–8 are omitted since components in these figures are the same as those in FIG. 5.

As shown in FIGS. 5–8, when the first non-circular gear 15 is rotated from 0° state in the direction indicated by an arrow A due to the rotation of the handle 1 in the line-winding direction, the second non-circular gear 16a is rotated in the direction indicated by an arrow B. When the tooth Mx of the first non-circular gear 15 corresponding to the maximum tip diameter meshes with the tooth Mn of the second non-circular gear 16a corresponding to the minimum tip diameter, the gear reduction ratio is the minimum. Thus, the rotary cam 16 rotates at the highest speed. To the contrary, when the tooth of the first non-circular gear 15 corresponding to the minimum tip diameter meshes with the tooth of the second non-circular gear 16a corresponding to the maximum tip diameter, the gear reduction ratio is the maximum. Thus, the rotary cam 16 rotates at the lowest speed. The first non-circular gear 15 and the second non-circular gear 16a are disposed such that the gear reduction rate is small around the front and rear ends of the stroke of the slider 17 to make the speed of the slider 17 slow, while the gear reduction ratio is designed to be large in areas where the cam protrusion 16b is positioned directly above and directly under the attachment shaft 2f to make the speed of the slider 17 fast. In addition, the second and third cam slots 17c and 17d are curved from the first cam slot 17b toward opposite directions. Accordingly, the rear end of the stroke of the slider 17 is reached when the first non-circular gear 15 rotates 270° as shown in FIG. 6, as opposed to when the first non-circular gear 15 rotates 225° as shown in FIG. 5. Similarly, the front end of the stroke of the slider 17 is reached when the first non-circular gear 15 rotates 720°, as opposed to 675° as shown in FIG. 7. Additionally, the mid point of the stroke of the slider 17 can also be offset from the midpoint of the cam protrusion 16b in the top and bottom direction.

FIG. 9 shows the stroke of the slider 17, in other words, the distance L from the reference position (the center position P of the cam groove 17a where the cam protrusion 16b is positioned directly above the attachment shaft 2f) to the center of the cam protrusion 16b as the first non-circular gear 15 rotates, plotted versus the rotational angle. In FIG. 9, the stroke L of the slider 17 from the reference position is the vertical axis, and the rotational angle of the non-circular gear 15 is the horizontal axis.

The reduction ratio is designed to be small in the phases near the front and rear ends of the stroke, in which the speed of axial movement tends to be low. Thus, the rotary cam 16 rotates fast in these phases. On the other hand, the reduction ratio is designed to be large in the phases where the cam protrusion 16b is positioned above or below the attachment shaft 2f, where the speed tends to be fast. Thus, the rotary cam 16 rotates slow in these phases. In conventional gear-down oscillating mechanisms that do not have an elliptic gear, this graph would be a sine curve, but in the present embodiment, it is nearly first-order straight lines. Furthermore, since the rotary cam 16 rotates approximately at ⅕ the rotation speed of the first non-circular gear 15, fishing line can be tightly wound onto the spool 4.

Moreover, the slider 17 is fixedly coupled to the spool shaft 8 with the countersunk screws 21 that interpose the cam groove 17a. Accordingly, the spool shaft 8 reinforces the specific strength of the slider 17. Thus, the cam groove 17a is less prone to being deformed even when pressed by the cam protrusion 16b. Therefore, even if the slider 17 is provided with the penetrating cam groove 17a, it is possible to curb degradation in the transmission efficiency from the first non-circular gear 15 to the slider 17.

SECOND EMBODIMENT

Referring now to FIGS. 10–17, spinning reels in accordance with alternate embodiments will now be explained. In view of the similarity between the first and alternate embodiments, the parts of the alternate embodiments that are identical to the parts of the first embodiment will be given the same reference numerals as the parts of the first embodiment. Moreover, the descriptions of the parts of the alternate embodiments that are identical to the parts of the first embodiment may be omitted for the sake of brevity.

Figure 10:
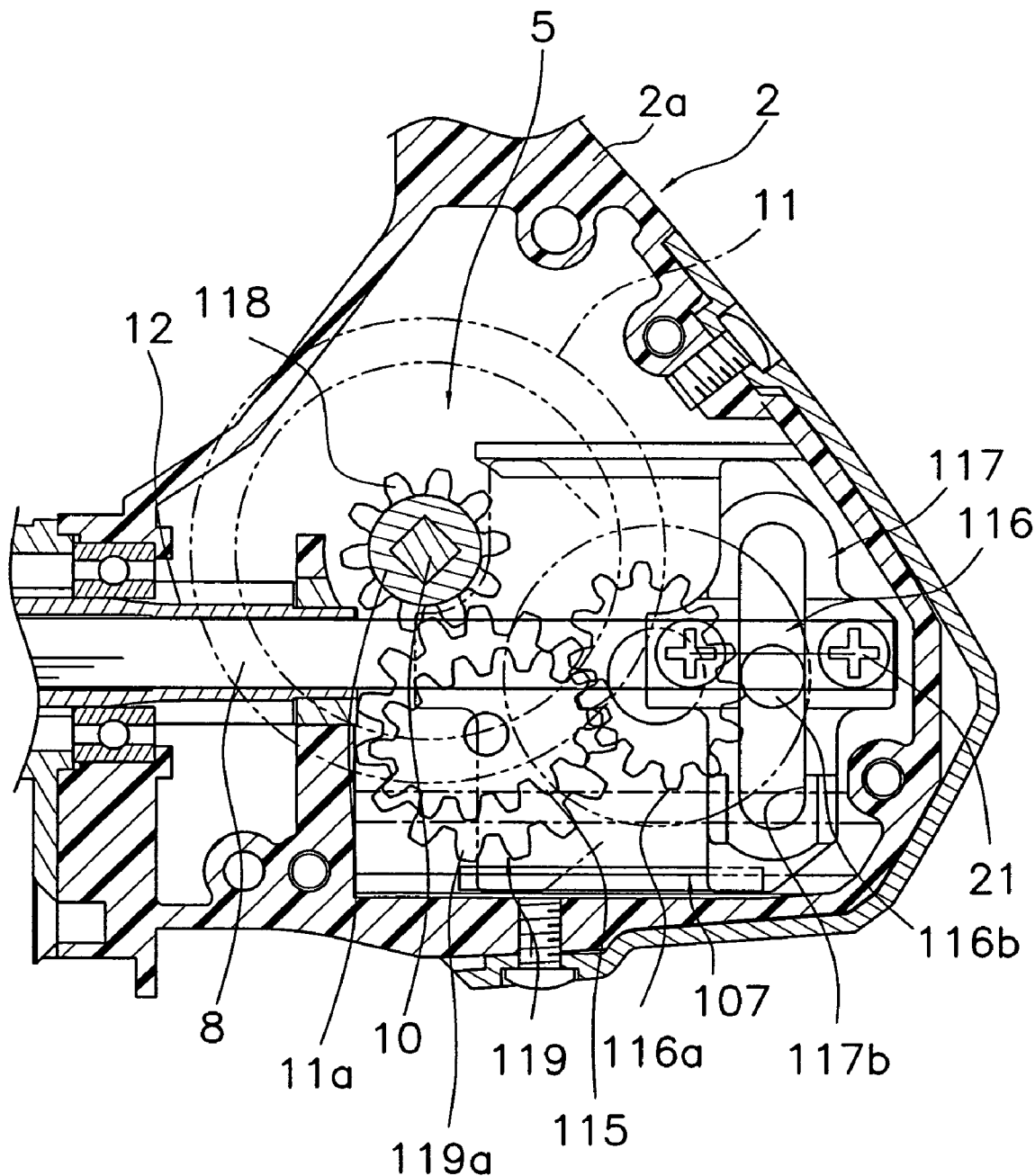
FIG. 10 is an enlarged cross-sectional view of an oscillating mechanism in accordance with a second embodiment.

The gear reduction is achieved between the first non-circular gear 15 and the second non-circular gear 16a in the foregoing first embodiment. However, the gear reduction can also be achieved between a first circular gear 118, which is mounted to the master gear shaft 1a, and an intermediate gear unit 119, which is disposed between the first circular gear 118 and a rotary cam 116 as shown in FIG. 10. The movement can be also brought near to a uniform velocity rectilinear motion by using non-circular gears between the intermediate gear unit 119 and the rotary cam 116.

The oscillation mechanism 107 of FIG. 10 includes the first circular gear 118, the intermediate gear unit 119, the rotary cam 116, and a slider 117.

The master gear shaft 11a is non-rotatably provided with the first circular gear 118. The first circular gear 118 and the master gear shaft 1a can be formed integrally or separately. The first circular gear 118 is a spur gear or helical gear with ten teeth, for example.

The intermediate gear unit 119 is a disc-shaped member, and is mounted to the reel body 2a rotatably about an axis that is parallel to the first circular gear 118. The intermediate gear unit 119 includes a second circular gear 119a meshing with the first circular gear 118, and a first non-circular gear 115 arranged concentrically with the second circular gear 119a. The number of teeth of the second circular gear 119a is greater than that of the first circular gear 118. The second circular gear 119a is a spur gear or helical gear with 15 teeth, for example. The first non-circular gear 115 is a bi-lobe elliptic gear with 14 teeth, for example. The second circular gear 119a and the first non-circular gear 115 can be formed integrally or separately. In addition, they may be spaced from each other, or may be in contact with each other.

The rotary cam 116 is a disc-shaped member, and is mounted to the reel body 2a rotatably about an axis so as to be parallel with the first non-circular gear 115. The rotary cam 116 includes the second non-circular gear 116a formed on the outer periphery thereof, and a columnar cam protrusion 116b protruding in a direction that is parallel to the master gear shaft 11a. The second non-circular gear 116a is a bi-lobe elliptic gear with teeth, the number of the teeth being the same as that of the first non-circular gear 115. The second non-circular gear 116a is arranged so that a tooth corresponding to the minimum tip diameter of the second non-circular gear 116a meshes with a tooth corresponding to the maximum tip diameter of the first non-circular gear 115.

The slider 117 includes a penetrating cam groove 117a engaging the cam protrusion 116b, and is mounted to the reel body 2a so as to be oscillated in the axial direction of the spool shaft 8. The slider 117 is guided in the axial direction of the spool shaft 8 by a support structure including a guide shaft (not shown) mounted to the reel body 2a in parallel to the spool shaft 8. The rear end of the spool shaft 8 is mounted to the spool 117 non-rotatably and immovably in the axial direction by the countersunk screws 21. The cam groove 117a is a penetrating groove with an oval shape.

With the oscillating mechanism 107, the gear reduction is achieved between the first circular gear 118 and the second circular gear 119a. The movement can be brought near to a uniform velocity rectilinear motion relative to the rotation speed of the first non-circular gear 115 and the second non-circular gear 116a. More specifically, the reduction ratio of the non-circular gears 115 and 116a is designed to be the smallest at the phases corresponding to the front and rear end portions of the stroke of the slider 117, thus, the speed of the axial movement is maintained high. On the other hand, the reduction ratio of the both non-circular gears 115 and 116a is designed to be the largest when the cam protrusion 116b is positioned above or below the attachment shaft 2f. Thus, the speed of the axial movement is maintained low.

In this case, since the rotational movement is converted into rectilinear movement by using the elliptic non-circular gears having the same number of teeth, the movement can be easily brought further near to a uniform velocity rectilinear movement. In addition, in the embodiment employing the intermediate gear unit, the gearing down may be achieved by an engagement between non-circular gears that have different number of gears.

Figure 16:
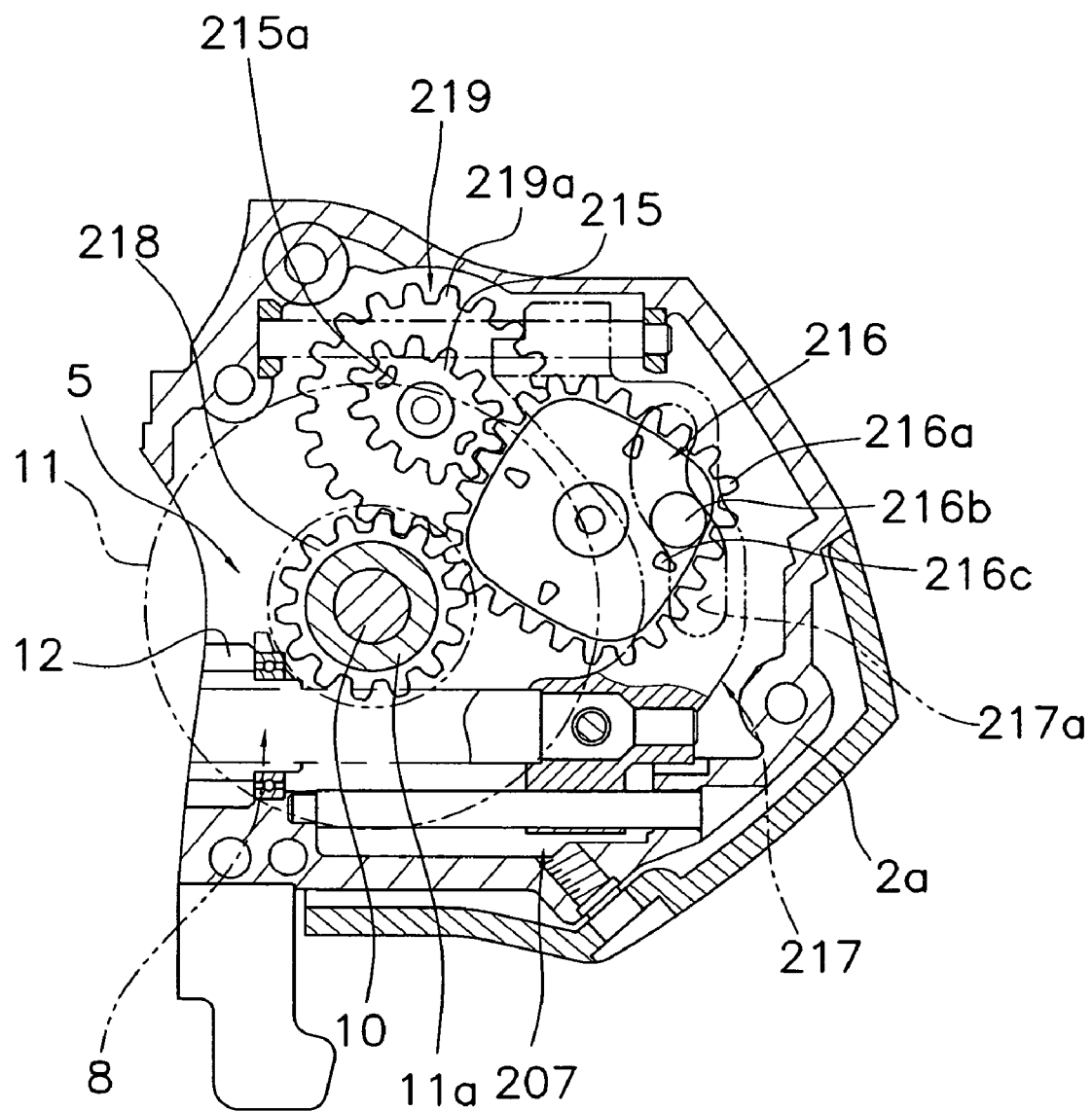
FIG. 16 is a cross-sectional view of the spinning reel in accordance with a modified second embodiment of the present invention.

The oscillation mechanism 207 of FIG. 16 includes a first circular gear 218, an intermediate gear unit 219, a rotary cam 216, and a slider 217. The master gear shaft 11a is non-rotatably provided with the first circular gear 218. The first circular gear 218 and the master gear shaft 11a can be formed integrally or separately. The first circular gear 218 is a spur gear or helical gear with 14 teeth, for example.

The intermediate gear unit 219 is a disc-shaped member, and is mounted to the reel body 2a rotatably about an axis so as to be parallel with the first circular gear 218. The intermediate gear unit 219 includes a second circular gear 219a meshing with the circular gear 218, and a first non-circular gear 215 arranged concentrically with the second circular gear 219a. The number of teeth of the second circular gear 219a is greater than that of the first circular gear 218. The second circular gear 219a is a spur gear or helical gear with 20 teeth, for example. The first non-circular gear 215 is a bi-lobe elliptic gear with 12 teeth, for example. In addition, two marks 215a are drawn on the side surface of the first non-circular gear 215 in FIG. 16 to indicate the position corresponding to the maximum tip diameter. The second circular gear 219a and the first non-circular gear 215 can be formed integrally or separately. In addition, they may be spaced from each other, or may be in contact with each other.

The rotary cam 216 is a disc-shaped member, and is mounted to the reel body 2a rotatably about an axis so as to be parallel with the first non-circular gear 215. The rotary cam 216 includes the second non-circular gear 216a formed on the outer periphery thereof, and a columnar cam protrusion 216b protruding in a direction that is parallel to the master gear shaft 11a. The number of teeth of the second non-circular gear 216a is greater than that of the first non-circular gear 215. The second non-circular gear 216a is a quad-lobe elliptic gear with 24 teeth, for example. The second non-circular gear 216a is arranged so that a tooth corresponding to the minimum tip diameter of the second non-circular gear 216a meshes with a tooth corresponding to the maximum tip diameter of the first non-circular gear 215. Accordingly, the engagement between the non-circular gears 215 and 216a has a gear-down effect.

In addition, four marks 216c are drawn on a side surface of the second non-circular gear 216a in FIG. 16 to indicate the position corresponding to the minimum tip diameter. Accordingly, by assembling the two non-circular gears 215 and 216a while aligning the marks 215 and 216 with each other, it is possible to ensure that the non-circular gears 215 and 216a engage properly. This can facilitate the gear assembly task.

The slider 217 includes a penetrating cam groove 217a engaging the cam protrusion 216b, and is supported to the reel body 2a so as to be oscillated in the axial direction of the spool shaft 8. The slider 217 is guided in the axial direction of the spool by a support structure including a guide shaft (not shown) mounted to the reel body 2*a* in parallel to the spool shaft 8. The rear end of the spool shaft 8 is mounted to the slider 217 non-rotatably and immovably in the axial direction by the countersunk screws 21. The cam groove 217*a* has a shape that is a mirror image of the shape of the cam groove 17*a* shown in FIG. 3.

In addition, in the embodiment shown in FIG. 16, the rotary cam 216 is arranged at a fishing rod attachment side of the reel body 2*a* relative to the master gear shaft 11*a*. Additionally, the intermediate gear unit 219 is arranged at the fishing rod attachment side of the reel body 2*a* relative to the rotary cam 216. Accordingly, the center of gravity of the entire spinning reel shifts toward the fishing rod attachment side. This reduces the load of the reel as felt by the fisherman. Moreover, since the rotary cam 216 is arranged at the fishing rod attachment side of the reel body 2*a*, the opposite side, i.e., the lower side, of the reel unit 2 can be thinned.

OTHER EMBODIMENTS (a) In the foregoing first embodiment, the second and third cam slots 17*c* and 17*d* of the cam groove 17*a* of the slider 17 have different shapes. However, they may have the same symmetrical shapes with respect to the center of the cam groove 17*a* as shown in FIGS. 11–14. The cam groove 17*a*' of the slider 17' includes a first cam slot 17*b*' that extends through the center P diagonally toward opposite directions in the front-rear direction, and second and third cam slots 17*c*' and 17*d*', which are curved from the first cam slot 17*b*' toward opposite direction and extend toward the both ends Q1' and Q2' respectively. The both ends Q1' and Q2' of the second and third cam slots 17*c*' and 17*d*' are respectively offset from the center P forwardly (leftward in FIG. 11) and rearwardly (rightward in FIG. 11) by the same distance respectively. Forming the cam groove 17*a*' in the above shape can offset the front and rear end positions of the stroke of the slider 17' from the front and rear end positions of the cam protrusion 16*b*. Additionally, as shown in the 0° position of FIG. 11, the top and bottom positions where the cam protrusion 16*b* is positioned directly above and directly under the attachment shaft 2*f* can be deviated from the mid position of the stroke of the slider 217. In addition, it is possible to make the stroke of the slider 17' greater than twice the length between the cam protrusion 16*b* and the center of the rotational cam 16.

Figure 11:
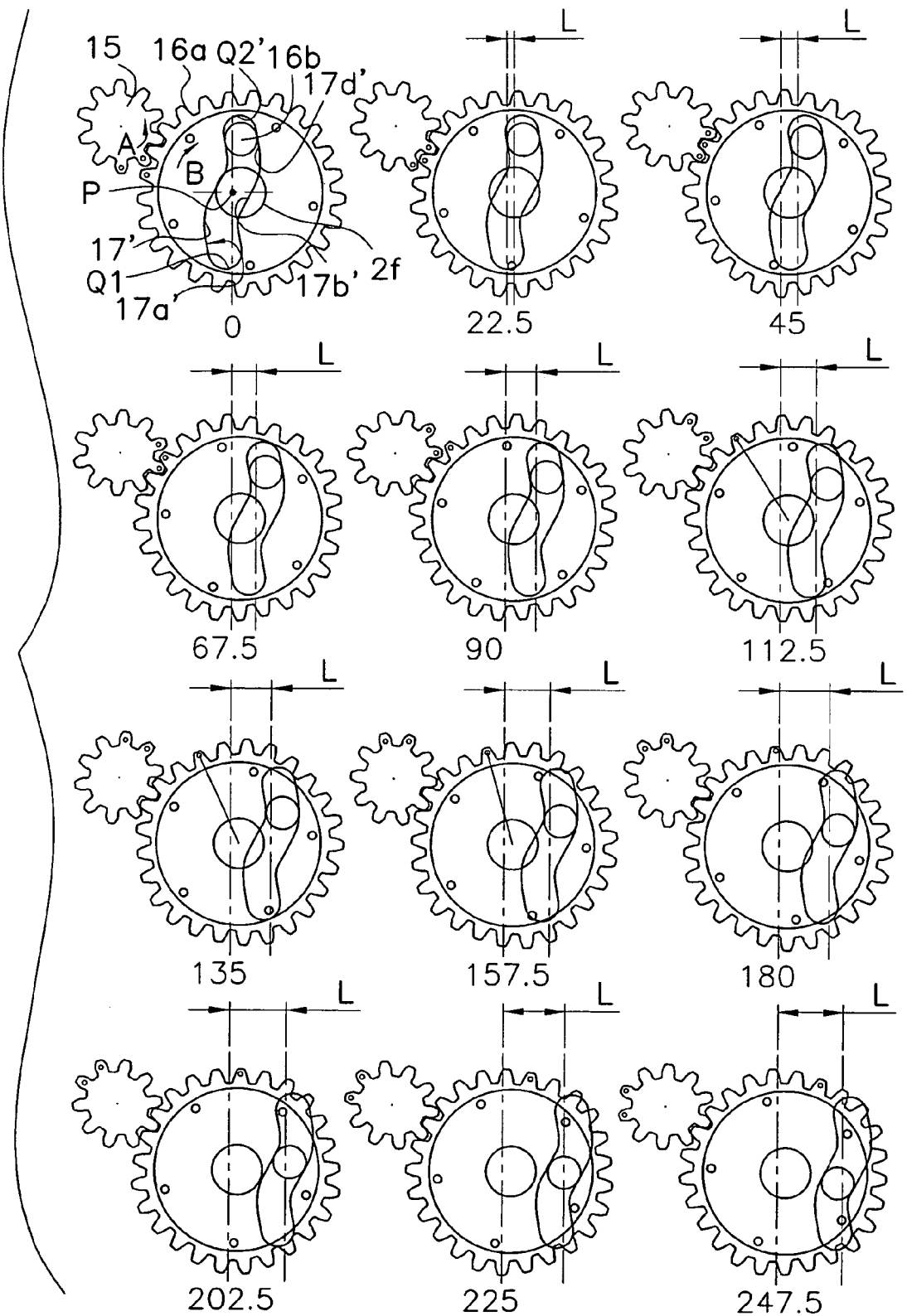
FIG. 11 is a schematic view corresponding to FIG. 5 showing position relationship among a first non-circular gear, a rotary cam and a slider in motion of the oscillating mechanism in accordance with an alternate embodiment (a) of the present invention.
Figure 12:
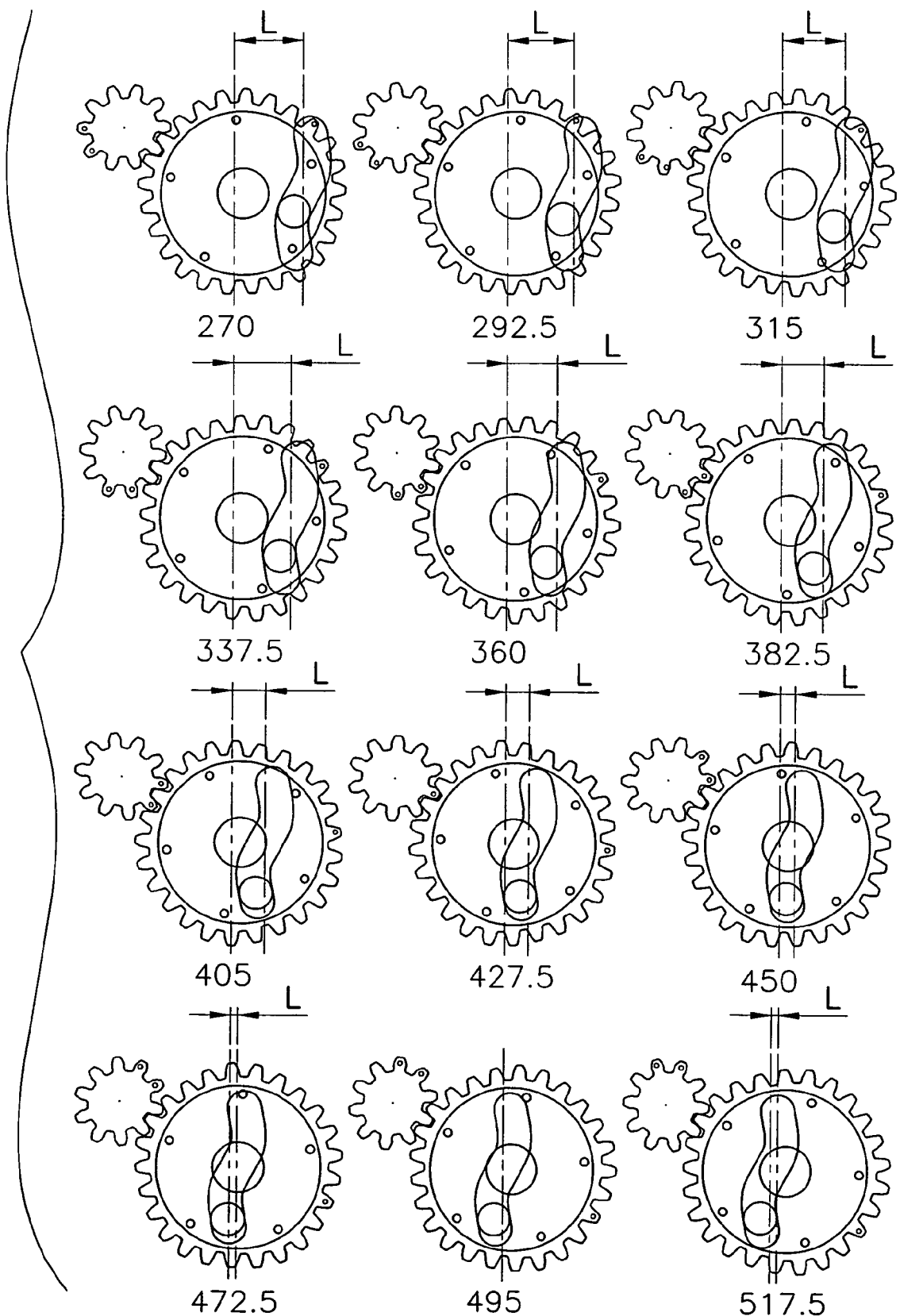
FIG. 12 is a schematic view corresponding to FIG. 6 showing position relationship among a first non-circular gear, a rotary cam and a slider in motion of the oscillating mechanism in accordance with the alternate embodiment (a) of the present invention.
Figure 13:
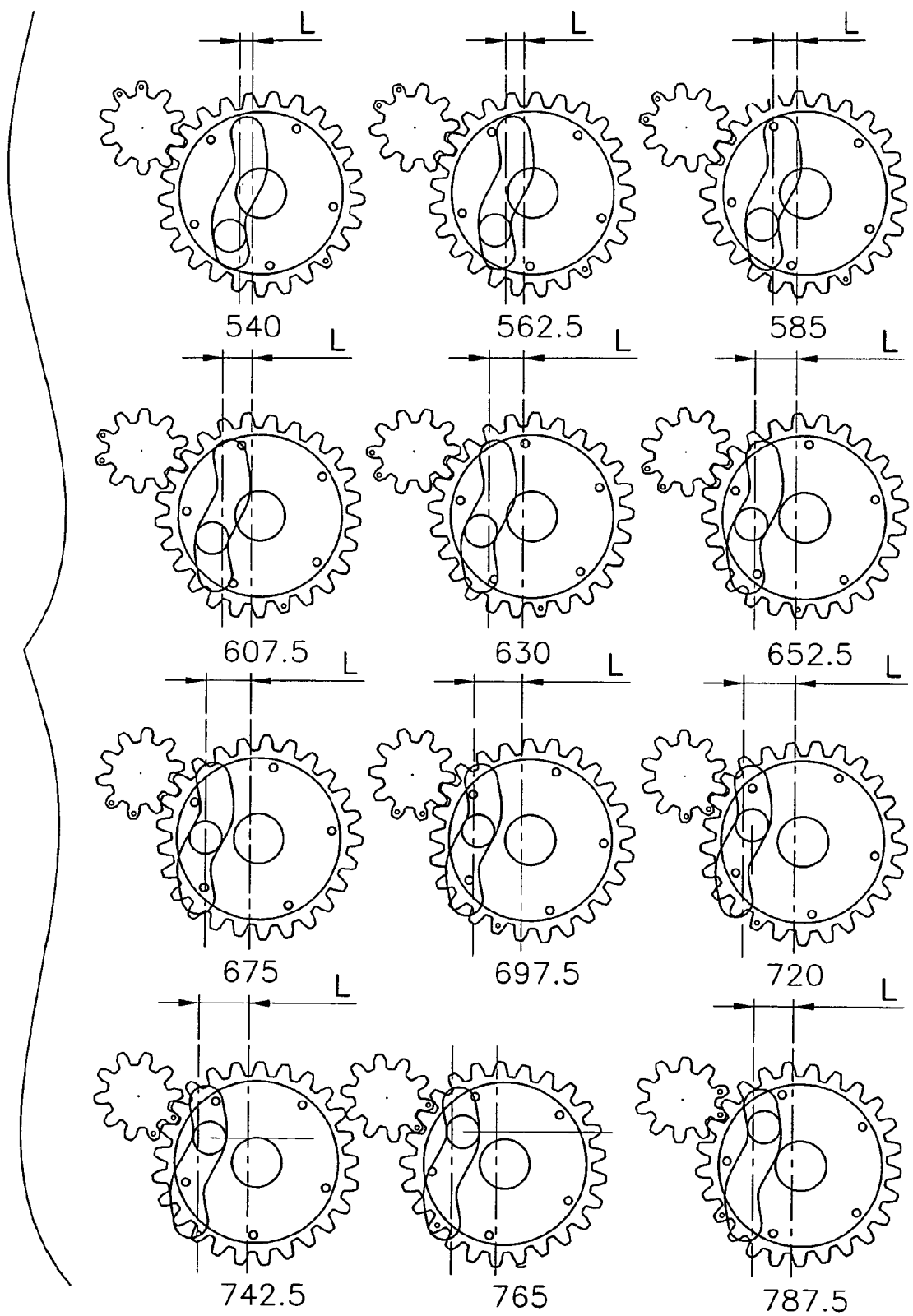
FIG. 13 is a schematic view corresponding to FIG. 7 showing position relationship among a first non-circular gear, a rotary cam and a slider in motion of the oscillating mechanism in accordance with the alternate embodiment (a) of the present invention.
Figure 14:
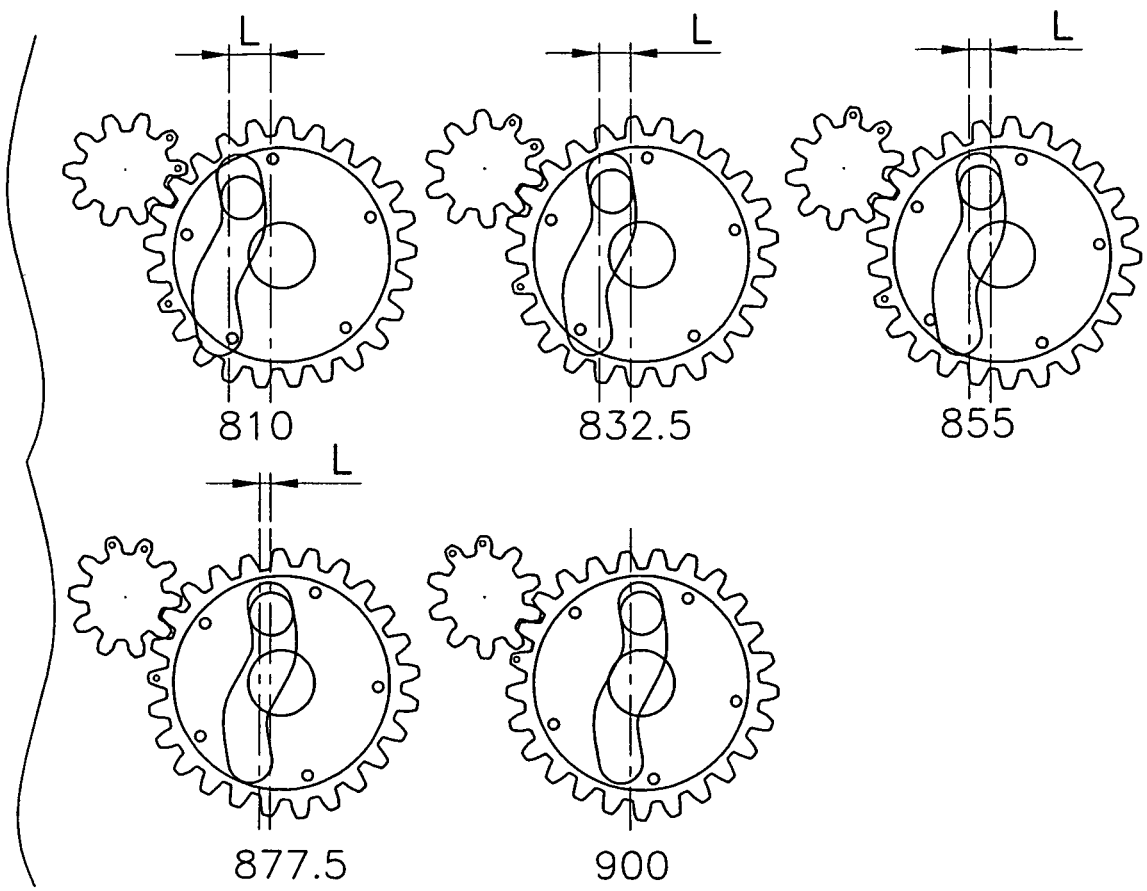
FIG. 14 is a schematic view corresponding to FIG. 8 showing position relationship among a first non-circular gear, a rotary cam and a slider in motion of the oscillating mechanism in accordance with the alternate embodiment (a) of the present invention.

Additionally, the second and third cam slots 17*c*' and 17*d*' are curved from the first cam slot 17*b*' toward opposite directions. Accordingly, the rear end of the stroke of the slider 17' is reached when the first non-circular gear 15 rotates 270° as shown in FIG. 12 as opposed to when the first non-circular gear 15 rotates 225° as shown in FIG. 11. Similarly, the front end of the stroke of the slider 17' is reached when the first non-circular gear 15 rotates 720° as opposed to 675° as shown in FIG. 13. Furthermore, the mid point of the stroke of the slider 17' is also offset from the midpoint of the cam protrusion 16*b* in the top-bottom direction.

Figure 15:
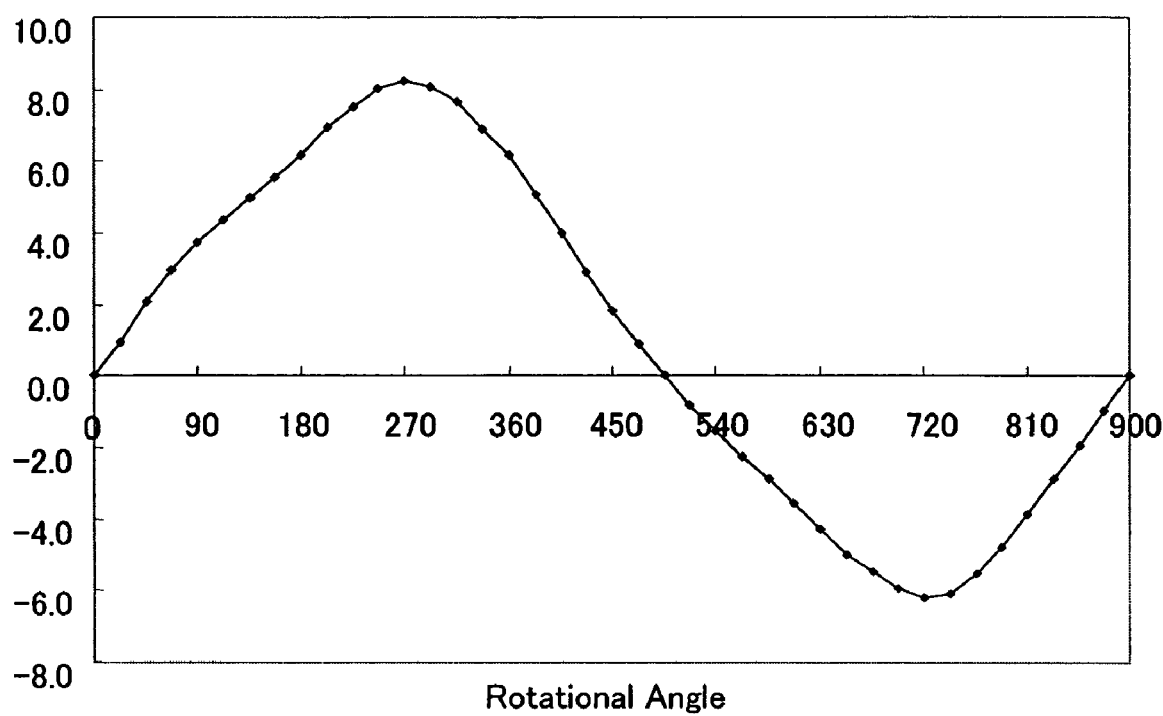
FIG. 15 is a graph corresponding to FIG. 9 showing relationship between non-circular gear rotational angle and slider stroke in accordance with the alternate embodiment (a) of the present invention.

FIG. 15 shows the stroke of the slider 17', in other words, the distance L from the reference position (the center position P of the cam groove 17*a*' where the cam protrusion 16*b* is positioned directly above the attachment shaft 2*f*) to the center of the cam protrusion 16*b* as the first non-circular gear rotates, plotted versus the rotational angle. In FIG. 15, the stroke L of the slider 17 from the reference position is the vertical axis, and the rotational angle of the non-circular gear 15 is the horizontal axis.

In this case, similarly to the foregoing first embodiment, the cam protrusion 16*b* comes directly above and directly under the attachment shaft 2*f* at positions that are deviated in the left-right direction from the mid position of the stroke of the slider 17. In other words, the mid point of the stroke of the slider 17 is offset from the points that the cam protrusion 16*b* reaches when the rotational angle is 0° or 450°. Accordingly, the stroke as viewed at each rotational angle is deviated from a sine curve, particularly at the top and bottom and the front and rear end positions of the movement of the cam protrusion 16*b*. Thus, the movement of the slider 17' can be brought further closer to a uniform velocity rectilinear motion.

(b) In the foregoing embodiments, the lever-brake type spinning reel is described as an example, however the present invention is not limited to this configuration. The present invention can be applied to any kinds of traverse cam type oscillating mechanisms of spinning reels, such as a front-drag type spinning reel, a rear-drag type spinning reel, a lever-drag type-spinning reel, and a closed-face type spinning reel, for example. Besides, in the case of a rear-drag type spinning reel, a spool shaft is mounted to a slider rotatably and immovably in the axial direction.

(c) In the foregoing embodiments, the bi-lobe, quad-lobe and penta-lobe second non-circular gears are described as examples. However, any multi-lobe non-circular gear can be used as the second non-circular gear, and the number of lobes is not limited to those in the embodiments.

(d) In the foregoing embodiments, in order to easily assemble the gears, the white circles 16*c* are drawn in the second non-circular gear 16*a* as the first marks, while the marks 215*a* and 216*c* are drawn in the first and second non-circular gears 215 and 216*a* as the first marks. Particularly, in the case where the intermediate gear unit 219 is provided, adjustment of the rotational phase between the intermediate gear unit 219 and the rotary cam 216 is required. Accordingly, drawing the marks 215*a* and 216*c* in the non-circular gears 215 and 216*a* can allow adjustment of the rotational phase between the two non-circular gears 215 and 216*a* at a particular phase (a phase in which the tooth corresponding to the maximum tip diameter of the first non-circular gear 215 meshes with the tooth corresponding to the minimum tip diameter of the second non-circular gear 216*a*) for assembly. However, in contrast to the first embodiment, when the intermediate gear unit 219 is not provided, the master gear 11 hides the first non-circular gear 15. For this reason, even if the marks are drawn in both non-circular gear 15 and 16*a*, it is difficult to view the marks and to adjust the both of the non-circular gears 15 and 16*a* at the particular phase for assembly. Accordingly, the marks may instead be drawn in the reel unit 2, and both of the non-circular gears 15 and 16*a*.

Figure 17:
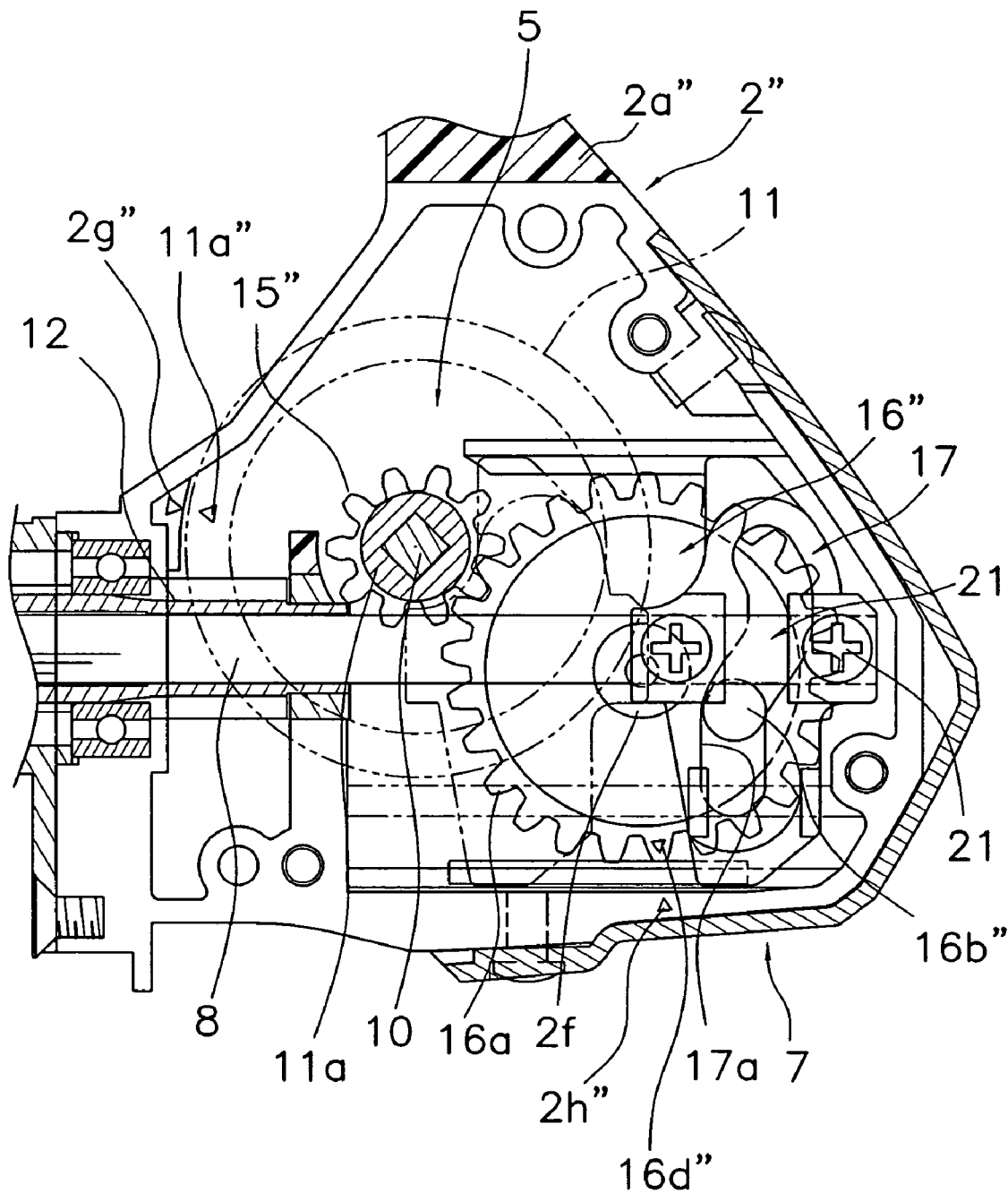
FIG. 17 is a cross-sectional view of the spinning reel in accordance with a still another embodiment of the present invention.

In FIG. 17, the two non-circular gears 15" and 16*a*" are arranged so that a tooth corresponding to the minimum tip diameter of the second non-circular gear 16*a*" meshes with a tooth corresponding to the maximum tip diameter of the first non-circular gear 15". A mark 11*a*" as a third mark and a mark 2*g*" as a second mark for assembly are drawn on the back surface of the master gear 11, which rotates with the first non-circular gear 15", and an attachment surface of the lid member 2*d*" of the reel body 2*a*" adjacent to the master gear 11 by a suitable drawing method such as printing and painting. A mark 16*d* as a first mark and a mark 2*h*" as a second mark for assembly are also drawn in the second non-circular gear 16*a*", and an attachment surface of the lid member 2*d*" of the reel body 2*a*" adjacent to the second non-circular gear 16*a* by a suitable drawing method such as printing, and painting. The marks 1*aa*" and 2*g*" are drawn so that a tooth corresponding to the minimum tip diameter of the second non-circular gear 16*a*" can mesh with a tooth corresponding to the maximum tip diameter of the first non-circular gear 15", when the master gear shaft 11 is mounted to the reel body 2a" while aligning the marks 11a" and 2g" with each other in a state where the rotary cam 16" is mounted to the reel body 2a" with the mark 16d" with the mark 2h" being aligned to each other.

Thus, when the two gears 15" and 16a" are assembled, the rotary cam 16" having the second non-circular gear 16a" is initially mounted to the reel body 2a". At this time, the rotary cam 16" is mounted to the reel body 2a" so as to adjust the rotational phase while aligning the mark 2h" with the mark 16d". After the rotary cam 16" is mounted, and the spool shaft 8 and the slider 17 are mounted, the master gear 11 is mounted to the reel body 2a" while aligning the mark 1a" with the mark 2g". In this manner, the gears are arranged so that the tooth corresponding to the minimum tip diameter of the second non-circular gear 16a" meshes with the tooth corresponding to the maximum tip diameter of the first non-circular gear 15". When the four marks 15a", 2g", 16d" and 2h" are drawn, alignment of the marks can allow the two non-circular gears 15" and 16a" to mesh with each other at the particular phase easily even if the master gear 11 hides the first non-circular gear 15". Therefore, an assembly task of the two gears 15" and 16a" can be easy, and the assembly costs can be reduced.

According to the present invention, since the gearing down is achieved between the first non-circular gear and the second non-circular gear, or between the first circular gear and the second circular gear, the speed of axial movement of the slider can be reduced. This facilitates tight winding of the fishing line. Furthermore, the bi-lobe first non-circular gear and the multi-lobe second non-circular gear are arranged so that a tooth corresponding to the minimum tip diameter of one of the first and second non-circular gears meshes with a tooth corresponding to the maximum tip diameter of the other of the first and second non-circular gears. Therefore, the movement of the slider can be brought close to a uniform velocity rectilinear motion by modifying the angular velocity of the second non-circular gear during its rotation, even when the first non-circular gear rotates at a uniform angular velocity.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus-function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Applications Nos. 2003-302347 and 2004-110296. The entire disclosure of Japanese Patent Applications Nos. 2003-302347 and 2004-110296 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An oscillating device of a spinning reel for oscillating a spool front and rear as a handle of the spinning reel rotates, the spool being attached to a spool shaft in a reel unit of the spinning reel, the oscillating device comprising:
    a bi-lobe first non-circular gear mounted to a rotational axis of the handle;
    a rotary cam rotatably mounted in the reel unit so as to be parallel with the first non-circular gear, the rotary cam having
        a cam protrusion protruding in a direction that is parallel to the rotational axis, and
        a multi-lobe second non-circular gear mounted in the reel unit such that a tooth corresponding to a minimum tip diameter of one of the first and second non-circular gears meshes with a tooth corresponding to a maximum tip diameter of the other of the first and second non-circular gears, the number of teeth of the second non-circular gear being greater than that of the first non-circular gear; and
    a slider mounted in the reel unit so as to be movable in an axial direction of the spool shaft, the slider being mounted to the spool shaft so as to be relatively immovable at least in the axial direction of the spool shaft, the slider including a cam groove that engages the cam protrusion.

2. The spinning-reel oscillating device set forth in claim 1, wherein
    the second non-circular gear is a quad-lobe or penta-lobe noncircular gear.

3. The spinning-reel oscillating device set forth in claim 1, wherein
    at least one of the first non-circular gear and the second non-circular gear is provided with a first mark that indicates the tooth corresponding to a maximum or minimum tip diameter.

4. The spinning-reel oscillating device set forth in claim 3, wherein
    the first mark is provided at a tooth corresponding to the maximum tip diameter of one of the first and second non-circular gears, and at a tooth corresponding to the minimum tip diameter of the other of the first and second non-circular gears.

5. The spinning-reel oscillating device set forth in claim 3, wherein
    the reel unit is provided with a second mark that is adapted to be aligned with the first mark.

6. The spinning-reel oscillating device set forth in claim 3, wherein
    the reel unit is provided with two second marks, a master gear that is adapted to be mounted to the rotational axis of the handle so as to be concentric with the first non-circular gear is provided with a third mark, and the first, second, and the third marks are positioned such that when the first and second non-circular gears and the master gear are mounted in the reel unit with the first, second, and the third marks being aligned, a tooth corresponding to the minimum tip diameter of one of the first and second non-circular gears is meshed with a tooth corresponding to the maximum tip diameter of the other of the first and second non-circular gears.

7. An oscillating device of a spinning reel for oscillating a spool front and rear as a handle of the spinning reel rotates, the spool being attached to a spool shaft in a reel unit of the spinning reel, the oscillating device comprising:

a first circular gear mounted to a rotational axis of the handle;

an intermediate gear unit rotatably mounted in the reel unit and including
   a second circular gear mounted in the reel unit so as to be parallel with the first circular and meshing with the first circular gear, the number of teeth of the second circular gear being greater than that of the first circular gear, and
   a bi-lobe first non-circular gear mounted concentrically with the second circular gear, the number of teeth of the second circular gear being greater than that of the first circular gear;

a rotary cam rotatably mounted in the reel unit so as to be parallel with the first non-circular gear, the rotary cam having
   a cam protrusion protruding in a direction that is parallel to the rotational axis, and
   a multi-lobe second non-circular gear mounted in the reel unit such that a tooth corresponding to a minimum tip diameter of one of the first and second non-circular gears meshes with a tooth corresponding to a maximum tip diameter of the other of the first and second non-circular gears; and a slider mounted in the reel unit so as to be movable in an axial direction of the spool shaft, the slider being mounted to the spool shaft so as to be relatively immovable at least in the axial direction of the spool shaft, the slider including a cam groove that engages the cam protrusion.

8. The spinning-reel oscillating device set forth in claim 7, wherein
the number of teeth of the second non-circular gear is greater than that of the first non-circular gear.

9. The spinning-reel oscillating device set forth in claim 7, wherein
the second non-circular gear is a quad-lobe or penta-lobe noncircular gear.

10. The spinning-reel oscillating device set forth in claim 7, wherein
at least one of the first non-circular gear and the second non-circular gear is provided with a first mark that indicates the tooth corresponding to a maximum or minimum tip diameter.

11. An oscillating device of a spinning reel for oscillating a spool front and rear as a handle of the spinning reel rotates, the spool being attached to a spool shaft in a reel unit of the spinning reel, the oscillating device comprising:
a slider that is mounted to the spool shaft so as to be axially immovable relative to the spool shaft;

converting means for converting rotations of the handle to oscillating movements of the slider;
gear reduction means for transmitting the rotation of the handle to the converting means while reducing a rotational speed; and
speed control means for controlling the speed of the oscillating movements of the slider,
the speed control means including a bi-lobe first non-circular gear mounted to a rotational axis of the handle, and a second multi-lobe non-circular gear mounted in the reel unit such that a tooth corresponding to a minimum tip diameter of one of the first and second non-circular gears meshes with a tooth corresponding to a maximum tip diameter of the other of the first and second non-circular gears.

12. The spinning-reel oscillating device set forth in claim 11, wherein
the gear reduction means includes the bi-lobe first non-circular gear mounted to the rotational axis of the handle and the second multi-lobe non-circular gear rotatably mounted in the reel unit and meshing the first non-circular gear, the number of teeth of the second non-circular gear being greater than that of the first non-circular gear.

13. The spinning-reel oscillating device set forth in claim 11, wherein
the converting means includes a cam groove provided in the slider and a rotary cam, the rotary cam being rotatably mounted in the reel unit and including a cam protrusion that engages the cam groove.

14. An oscillating device of a spinning reel for oscillating a spool front and rear as a handle of the spinning reel rotates, the spool being attached to a spool shaft in a reel unit of the spinning reel, the oscillating device comprising:
a slider that is mounted to the spool shaft so as to be axially immovable relative to the spool shaft;
converting means for converting rotations of the handle to oscillating movements of the slider;
gear reduction means for transmitting the rotation of the handle to the converting means while reducing a rotational speed; and
speed control means for controlling the speed of the oscillating movements of the slider,
the gear reduction means including a first circular gear mounted to a rotational axis of the handle, and a second circular gear rotatably mounted in the reel unit and meshing the first circular gear, the number of teeth of the second circular gear being greater than that of the first circular gear.

15. The spinning-reel oscillating device set forth in claim 14, wherein
the speed control means includes a bi-lobe first non-circular gear mounted concentrically with the second circular gear, and a second multi-lobe non-circular gear rotatably mounted in the reel unit such that a tooth corresponding to a minimum tip diameter of one of the first and second non-circular gears meshes with a tooth corresponding to a maximum tip diameter of the other of the first and second non-circular gears.

16. The spinning-reel oscillating device set forth in claim 14, wherein
the converting means includes a cam groove provided in the slider and a rotary cam, the rotary cam being rotatably mounted in the reel unit and including a cam protrusion that engages the cam groove.

* * * * *